(12) United States Patent
Kolze et al.

(10) Patent No.: US 8,891,709 B2
(45) Date of Patent: Nov. 18, 2014

(54) ADAPTIVE EQUALIZATION AND INTERFERENCE CANCELLATION WITH TIME-VARYING NOISE AND/OR INTERFERENCE

(75) Inventors: Thomas Joseph Kolze, Phoenix, AZ (US); Bruce J. Currivan, Dove Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/451,199

(22) Filed: Apr. 19, 2012

(65) Prior Publication Data

US 2012/0201288 A1 Aug. 9, 2012

Related U.S. Application Data

(63) Continuation of application No. 12/078,923, filed on Apr. 8, 2008, now Pat. No. 8,180,001.

(60) Provisional application No. 60/960,868, filed on Oct. 17, 2007.

(51) Int. Cl.
*H04B 1/10* (2006.01)
*H04L 25/06* (2006.01)
*H04L 25/03* (2006.01)
*H04L 1/00* (2006.01)

(52) U.S. Cl.
CPC ..... *H04L 25/03019* (2013.01); *H04L 25/03038* (2013.01); *H04L 25/03286* (2013.01); *H04L 2025/03617* (2013.01); *H04L 1/0056* (2013.01); *H04L 25/067* (2013.01); *H04L 25/03057* (2013.01); *H04L 2025/03496* (2013.01)
USPC ........... 375/350; 375/316; 375/348; 375/346; 375/229; 375/232

(58) Field of Classification Search
USPC .......... 375/232, 350, 230, 229, 346, 316, 348
See application file for complete search history.

(56) References Cited

U.S. PATENT DOCUMENTS

| | | | |
|---|---|---|---|
| 6,690,753 B2 | 2/2004 | Kwon et al. | |
| 7,050,516 B2 | 5/2006 | Currivan et al. | |
| 7,095,719 B1 * | 8/2006 | Wilhelmsson et al. | 370/252 |

(Continued)

FOREIGN PATENT DOCUMENTS

EP     1722478 A1 * 11/2006   ............. H04L 25/03

OTHER PUBLICATIONS

Office Action mailed Jun. 1, 2012, in U.S. Appl. No. 12/899,997, Kolze et al., filed Oct. 7, 2010 (9 pages).

*Primary Examiner* — Leila Malek
(74) *Attorney, Agent, or Firm* — Sterne, Kessler, Goldstein & Fox P.L.L.C.

(57) ABSTRACT

A method and apparatus is disclosed to compensate for interference and/or distortion impressed onto a transmitted communication signal in the presence of one or more time-varying noise and/or interference conditions. A communications receiver includes a noise analyzer to characterize the composition of the interference and/or the distortion and produce a selection signal indicating the composition of the interference and/or the distortion. The communications receiver selects at least one set of equalization coefficients and/or updates at least one parameter of a least-squares algorithm or the suitable equivalent algorithm to compensate for the interference and/or the distortion impressed onto a transmitted communication signal in the presence of a particular time-varying noise and/or interference condition.

18 Claims, 12 Drawing Sheets

(56) References Cited

U.S. PATENT DOCUMENTS

| | | |
|---|---|---|
| 7,313,206 B2 | 12/2007 | Kolze |
| 7,961,823 B2 | 6/2011 | Kolze et al. |
| 7,978,795 B2 | 7/2011 | Currivan et al. |
| 2003/0174767 A1* | 9/2003 | Fujii et al. .................... 375/229 |
| 2005/0232196 A1* | 10/2005 | Joshi et al. .................... 370/329 |
| 2005/0271137 A1 | 12/2005 | Kolze et al. |
| 2005/0271169 A1 | 12/2005 | Momtaz et al. |
| 2006/0114982 A1 | 6/2006 | Liu et al. |
| 2006/0133471 A1 | 6/2006 | Ki |
| 2007/0097928 A1* | 5/2007 | Anderson .................... 370/335 |
| 2007/0165628 A1* | 7/2007 | Choi et al. .................... 370/389 |
| 2007/0230557 A1 | 10/2007 | Balasubramonian et al. |
| 2007/0263754 A1 | 11/2007 | Currivan et al. |
| 2009/0103669 A1 | 4/2009 | Kolze et al. |
| 2009/0135896 A1 | 5/2009 | Currivan et al. |

* cited by examiner

ADAPTIVE EQUALIZATION AND INTERFERENCE CANCELLATION WITH TIME-VARYING NOISE AND/OR INTERFERENCE

CROSS-REFERENCE TO RELATED APPLICATIONS

The present application is a continuation of U.S. patent application Ser. No. 12/078,923, filed Apr. 8, 2008, now allowed, which claims the benefit of U.S. Provisional Patent Appl. No. 60/960,868, filed Oct. 17, 2007, both of which are incorporated herein by reference in their entireties.

FIELD OF THE INVENTION

The present invention relates generally to adaptive equalizers and specifically to using an adaptive equalizer to compensate for interference and/or distortion impressed onto a transmitted communication signal in the presence of time-varying noise and/or interference conditions.

BACKGROUND

A communication system typically involves transmitting a modulated representation of a communication signal from a transmitter to a receiver over a communication channel. The communication channel may include a microwave radio link, a satellite channel, a fiber optic cable, or a copper cable to provide some examples. A communication channel contains a propagation medium that a transmitted communication signal passes through before reception by the receiver.

The propagation medium of the communication channel introduces interference and/or distortion into the transmitted communication signal causing a received communication signal to differ from the transmitted communication signal. Noise, signal strength variations known as fading, phase shift variations, multiple path delays known as multi-path propagation or echoes, to provide some examples, may introduce distortion into the transmitted communication signal. For example, transmission over a multiplicity of paths of different and variable lengths, or rapidly varying delays in the propagation medium from the transmitter to the receiver, may cause a change in the amplitude and/or phase of the transmitted communication signal. The communication channel may also introduce interference resulting from undesirable signals and/or noise into the transmitted communication signal causing the received communication signal to differ from the transmitted communication signal. The transmitter and/or the receiver may introduce interference and/or distortion into the transmitted communication signal causing the received communication signal to differ from the transmitted communication signal.

Communication systems may use an adjustable filter in the form of an adaptive equalizer to reduce the effect of the interference and/or the distortion attributable to the communication channel, the transmitter, and/or the receiver. To compensate for the interference and/or the distortion attributable to the communication channel, the transmitter, and/or the receiver, the adaptive equalizer adaptively adjusts an impulse response by updating equalization coefficients through, for example, a least-squares algorithm, such as the widely known Least Mean Squared (LMS), Recursive Least Squares (RLS), Minimum Mean Squared Error (MMSE) algorithms or any suitable equivalent algorithm that yields a least-squares result such as a dithering algorithm as disclosed in U.S. patent application Ser. No. 10/879,673, entitled "System and Method for Adjusting Multiple Control Loops Using Common Criteria," filed on Jun. 29, 2004, which is incorporated by reference in its entirety. In other words, the least-squares algorithm or the suitable equivalent algorithm may train the adaptive equalizer to compensate for the interference and/or the distortion uncorrelated with the transmitted communication signal. However, a conventional adaptive equalizer uses a scheme tantamount of time-averaging to determine correlation between the interference and/or the distortion and the transmitted communication signal. Those skilled in the relevant art(s) will recognize that the concepts disclosed within may be applicable to, but are not limited to, adaptive equalizers trained using a least-squares algorithm, or equivalent or near-equivalent, for coefficient adaptation, including block processing methods, recursive methods, slightly modified methods such as tap draining or inclusion of biasing signals or methods to provide stability, dithering methods and gradient methods, and/or multiple optimizations taking place in parallel with the adaptive equalizer to provide some examples.

Commonly, the interference and/or the distortion introduced by the communication channel may include one or more time-varying noise and/or interference conditions. As a result, the conventional adaptive equalizer may not properly determine the correlation between the interference and/or the distortion currently present and the transmitted communication signal. As a result of determining the correlation using scheme tantamount of time-averaging, the least-squares algorithm or the suitable equivalent may inadequately train the conventional adaptive equalizer to compensate for the interference and/or the distortion resulting from the transmitter, the communication channel, and/or the receiver impressed onto the transmitted communication signal in the presence of the one or more time-varying noise and/or interference conditions.

Therefore, what is needed is an adaptive equalizer that is capable of compensating for the interference and/or the distortion resulting from the communication channel, the transmitter, and/or the receiver impressed onto the transmitted communication signal in the presence of the one or more time-varying noise and/or interference conditions.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 1:
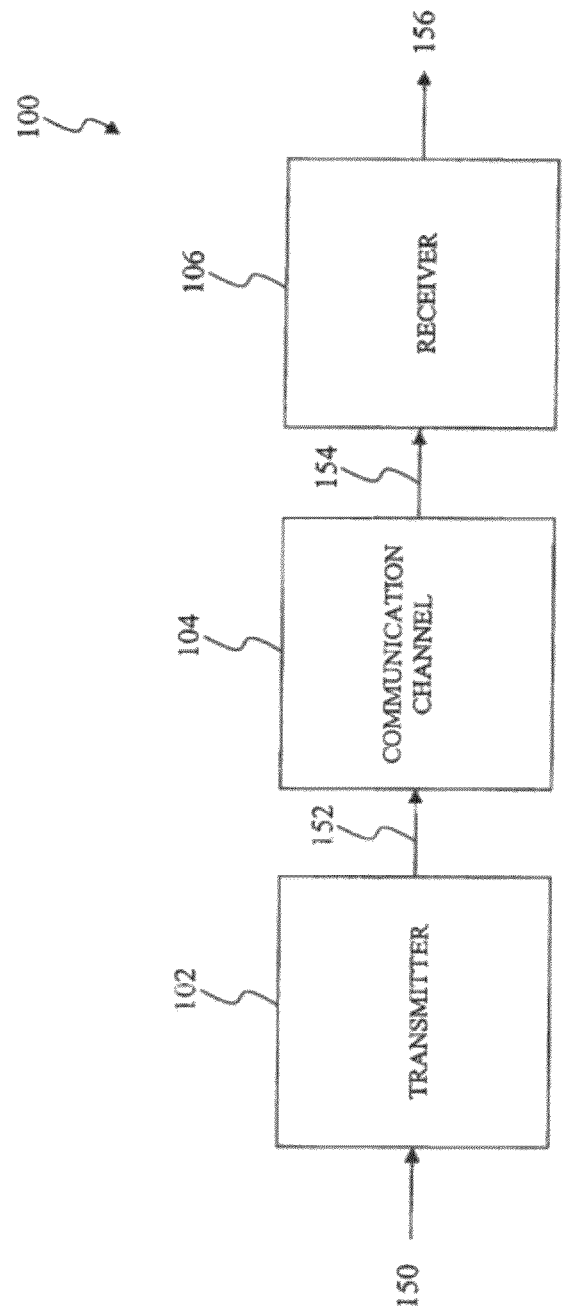
FIG. 1 illustrates a block diagram of a communication system according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein may be spatially arranged in any orientation or manner. Likewise, particular bit values of "0" or "1" (and representative voltage values) are used in illustrative examples provided herein to represent information for purposes of illustration only. Information described herein may be represented by either bit value (and by alternative voltage values), and embodiments described herein may be configured to operate on either bit value (and any representative voltage value), as would be understood by persons skilled in the relevant art(s).

The example embodiments described herein are provided for illustrative purposes, and are not limiting. Further structural and operational embodiments, including modifications/ alterations, will become apparent to persons skilled in the relevant art(s) from the teachings herein.

FIG. 1 illustrates a block diagram of a communication system according to an exemplary embodiment of the present invention. A communication system 100 includes a transmitter 102 to transmit a modulated representation of a digital communication signal 150 to a communications receiver 106 via a communication channel 104.

The digital communication signal 150 may be in a form of logic values based on the binary number system. The two symbols most commonly chosen to represent the two logic values taken on by the digital communication signal 150 are binary zero and binary one. The digital communication signal 150 may include, but is not limited to, messages, packets, frames, bits, or any other suitable digital information bearing signal to provide some examples. The digital communication signal 150 may additionally include, but is not limited to, modulated information bearing signals such as a Quadrature Phase-Shift Keyed (QPSK), a Phase-Shift Keyed (PSK), a Quadrature Amplitude Modulated (QAM), a Trellis Coded Modulated (TCM) modulated signal, or any other suitable modulation technique that will be apparent to those skilled in the art(s).

As shown in FIG. 1, the transmitter 102 produces a transmitted communication signal 152 by operating upon the digital communication signal 150. For example, the transmitter may, but is not limited to, modulate the digital communication signal 150 using suitable modulation techniques or upconvert the digital communication signal 152 to a carrier frequency to provide some examples.

The transmitted communication signal 152 passes through the communication channel 104 to produce a received communication signal 154. The communication channel 104 may include, but is not limited to, a microwave radio link, a satellite channel, a fiber optic cable, a hybrid fiber optic cable system, or a copper cable to provide some examples. The communication channel 104 contains a propagation medium that the transmitted communication signal 152 passes through before reception by the communications receiver 106. The propagation medium of the communication channel 104 introduces interference and/or distortion into the transmitted communication signal 152 to produce the received communication signal 154. Noise such as, but not limited to, thermal noise, burst noise, impulse noise, interference, signal strength variations known as fading, phase shift variations, multiple path delays known as multi-path propagation or echoes, to provide some examples, may introduce interference and/or distortion into the transmitted communication signal 152. In addition, the transmitter 102 and/or the receiver 106 may introduce interference and/or distortion into the transmitted communication signal 152 causing the received communication signal 154 to differ from the transmitted communication signal.

Referring back to FIG. 1, the communication system 100 includes the communications receiver 106 to receive the received communication signal 154. The communications receiver 106 produces a digital communication signal 156 based on the received communication signal 154. The communications receiver 106 may downconvert the received communication signal 154 to a baseband frequency, an intermediate frequency (IF), or any other suitable frequency that will be apparent to those skilled in the art(s). The communications receiver 106 may additionally compensate for the interference and/or the distortion impressed upon the transmitted communication signal 152 resulting from the transmitter 102, the communication channel 104, and/or the receiver 106 in the presence of one or more time-varying noise and/or interference conditions.

Figure 2:
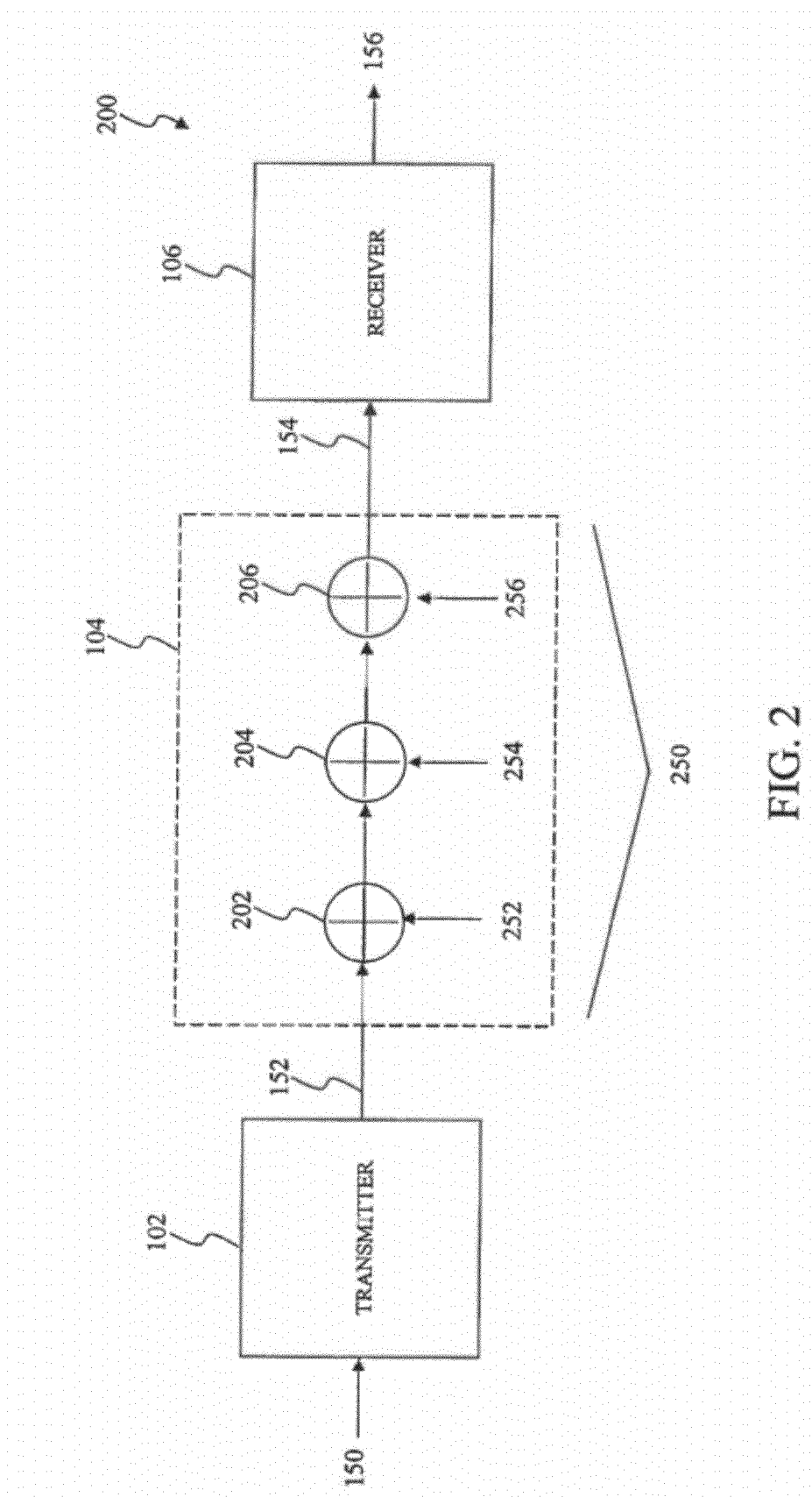
FIG. 2 illustrates a communication channel included in the communication system according to an exemplary embodiment of the present invention.

FIG. 2 illustrates a communication channel included in the communication system according to an exemplary embodiment of the present invention. As will be understood by persons skilled in the relevant art(s) from the teachings provided herein, the communication system 200 may be readily implemented in hardware, software, or a combination of hardware and software. For example, based on the teachings provided herein, a person skilled in the relevant art(s) may implement the communication system 200 via a combination of one or more application specific integrated circuits and a processor core for implementing software commands stored in one or more memories. However, this example is not limiting, and other implementations are within the scope and spirit of the present invention. The communication system 200 includes the transmitter 102 to transmit a representation of a digital communication signal 150 to the communications receiver 106 via the communication channel 104.

As shown in FIG. 2, the communication channel 104 includes a summer 202, a summer 204, and a summer 206. The summer 202 combines a noise and/or interference 252 resulting from the transmitter 102 with the transmitted communication signal 152. Likewise, the summer 204 combines a noise and/or interference 254 resulting from the communication channel 104 with the transmitted communication signal 152. Similarly, the summer 206 combines a noise and/or interference 254 resulting from the receiver 106 with the transmitted communication signal 152. Herein, a noise and/or interference 250 refers to any combination of the noise and/or interference 252, the noise and/or interference 254, and/or the noise and/or interference 256. The noise and/or interference 250 may additionally include other noise and/or distortion, such as, but is not limited to, linear filtering distortion, and other non-linear noise and/or interference that may or may not be additive in nature. The noise and/or interference 250 impresses interference and/or distortion onto the transmitted communication signal 152 causing the received communication signal 154 to differ from the transmitted communication signal 152.

Referring back to FIG. 1, the communications receiver 106 may include an adjustable filter in the form of an adaptive equalizer to reduce the effect of the noise and/or interference 250. To compensate for the noise and/or interference 250, a conventional adaptive equalizer adaptively adjusts an impulse response by updating equalization coefficients through a least-squares algorithm, such as the widely known Least Mean Squared (LMS), Recursive Least Squares (RLS), Minimum Mean Squared Error (MMSE) algorithms or any suitable equivalent algorithm that yields a least-squares result. In other words, the least-squares algorithm or the suitable equivalent may train the conventional adaptive equalizer to compensate for the noise and/or interference 250 correlated with the transmitted communication signal 152.

However, the conventional adaptive equalizer uses a scheme tantamount of time-averaging to determine a correlation between the noise and/or interference 250 and the transmitted communication signal 152. The noise and/or interference 250 may include one or more time-varying noise and/or interference conditions that the conventional adaptive equalizer cannot efficiently compensate for. In other words, the conventional adaptive equalizer cannot efficiently compensate for the noise and/or interference 250 when the noise and/or interference 250 is not necessarily fixed. The noise and/or interference 250 is not stationary, rather the statistics of the noise and/or interference 250 may vary with time. For example, the noise and/or interference 250 may include, but is not limited to, a narrowband, high powered component having a low duty cycle and a wider band, lower power component. Because of the low duty cycle, the narrowband, high powered component represents a time-varying interference condition by only contributing to the noise and/or interference 250 for a relatively short duration in time as compared to the wider band, lower power component. As a result of the one or more time-varying noise and/or interference conditions, the conventional adaptive equalizer may not adequately determine the correlation between the noise and/or interference 250 and the transmitted communication signal 152. In other words, the least-squares algorithm may not adequately train the conventional adaptive equalizer to compensate for the noise and/or interference 250 impressed onto the transmitted communication signal 152 in the presence of the one or more time-varying noise and/or interference conditions.

Figure 3:
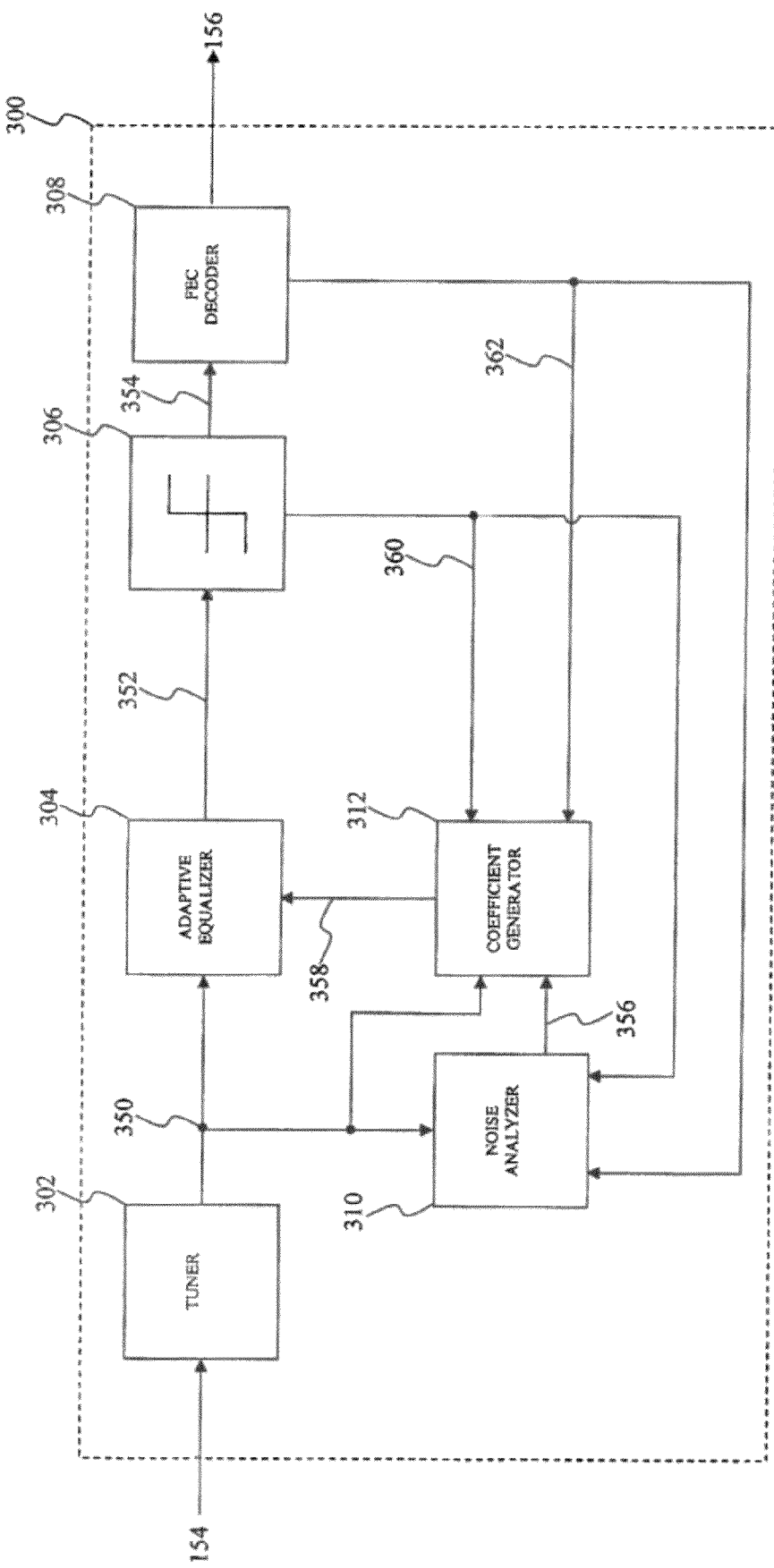
FIG. 3 illustrates a block diagram of a communications receiver used in the communication system according to an exemplary embodiment of the present invention.

FIG. 3 illustrates a block diagram of a receiver used in the communication system according to an exemplary embodiment of the present invention. A communications receiver 300 is an exemplary embodiment of the communications receiver 106 as shown in FIG. 1 and FIG. 2. The communications receiver 300 receives the received communication signal 154 from the communication channel 104. The received communication signal 154 includes the noise and/or interference 250 as described in conjunction with FIG. 2. The noise and/or interference 250 may include one or more time-varying noise and/or interference conditions. The communications receiver 300 may compensate for the interference and/or the distortion impressed onto the transmitted communication signal 152 by the noise and/or interference 250 in the presence of the one or more time-varying noise and/or interference conditions.

The communications receiver 300 includes a communications tuner 302, an adaptive equalizer 304, a slicer 306, a forward error correction (FEC) decoder 308, a noise analyzer 310, and a coefficient generator 312. The communications tuner 302 operates upon the received communication signal 154 to produce a communication signal 350. For example, the communications tuner 302 may downconvert and/or demodulate the received communication signal 154 to a baseband frequency, an intermediate frequency (IF), or any other suitable frequency using a suitable downconversion process that will be apparent to those skilled in the art(s). The communications tuner 302 may additionally perform functions such as, but not limited to, timing recovery, frequency estimation, carrier and/or phase recovery, automatic gain control (AGC) and/or any other parameter estimation of the received communication signal 154. The communication signal 350 includes interference and distortion resulting from the noise and/or interference 250 including the one or more time-varying noise and/or interference conditions. The communications tuner 302 may be implemented as, but is not limited to, a single conversion tuner, a double conversion tuner, or any other suitable tuner to downconvert the received communication signal 154 to provide some examples.

The adaptive equalizer 304 compensates for the noise and/or interference 250 in the presence of the one or more time-varying noise and/or interference conditions embedded in the communication signal 350 to produce an equalized communication signal 352. In the presence of the noise and/or interference 250 including the one or more time-varying noise and/or interference conditions, the equalized communication signal 352 includes substantially less interference and distortion when compared to the communication signal 350. More specifically, the adaptive equalizer 304 adaptively adjusts an impulse response according to equalization coefficients 358 to compensate for the noise and/or interference 250 in the presence of the one or more time-varying noise and/or interference conditions embedded in the communication signal 350. The adaptive equalizer 304 may be implemented as, but is not limited to, a decision feedback equalizer (DFE), a feed forward equalizer (FFE), any suitable interference cancellation circuit, a concatenation of an interference cancellation circuit and/or adaptive equalizer, and/or any combination thereof. The adaptive equalizer 304 may additionally include a remodulation function as disclosed in U.S. patent application Ser. No. 10/163,871, entitled "Receiver Having Decisional Feedback Equalizer with Remodulation and Related Methods," filed on Jun. 7, 2002, now U.S. Pat. No. 6,690,753 and other suitable functions such as disclosed in U.S. patent application Ser. No. 11/945,288, entitled "Fast Automatic Gain Control," filed on Nov. 27, 2007, both of which are incorporated by reference in their entirety.

The slicer 306 provides decisions based on the equalized communication signal 352 to produce a slicer decision 354. The slicer decision 354 may include a hard decision or a soft decision. The slicer 306 compares the equalized communication signal 352 to a threshold and assigns a digital value based on the comparison to produce the hard decision. The threshold value may be adjusted according to the encoding of the transmitted communication signal 152. For example, if the transmitted communication signal 152 is encoded according to a non-return-to-zero (NRZ) scheme, the threshold value of the slicer 306 may be assigned to the statistical mean of the positive and negative amplitudes representing the symbols binary one and binary zero. The symbols of the equalized output 352 that are greater than the threshold value of the slicer 306 may be assigned to binary one, while the symbols of the equalized output 352 that are less than the threshold value of the slicer 306 are assigned to binary zero. Alternatively, the slicer 306 may incorporate other information, such as a slicer error, a bit error ratio (BER) estimate, a symbol error ratio (SER) estimate, a signal to noise ratio (SNR) or any other suitable signal parameter into the hard decision to produce the soft decision.

Additionally, the slicer 306 produces a slicer information signal 360 based on the equalized communication signal 352 to communicate information 360 to the coefficient generator 312. The slicer 306 may communicate signal parameters such as the slicer error, the BER, the SER, the SNR or any other suitable signal parameter to the coefficient generator 312.

The forward error correction (FEC) decoder 308 enables the communications receiver 106 to correct for errors in the slicer decision 354 to produce the digital communication signal 156. In an exemplary embodiment, the FEC decoder is optional; the slicer 306 may directly generate the digital communication signal 156. The errors in the slicer decision 354 may result from, but are not limited to, the noise and/or interference 250 impressed into the transmitted communication signal 152, the downconverting of the received communication signal 154 by the communications tuner 302, or the digitization of the equalized communication signal 352 by the slicer 306 to provide some examples. The FEC decoder 308 may implement any decoding scheme, such as a block decoding scheme, such as Reed-Solomon decoding, a convolutional decoding scheme, such as the Viterbi algorithm, a concatenated decoding scheme involving inner and outer codes, decoding schemes using iterative decoding, and/or any other suitable decoding scheme that will be apparent to those skilled in the art(s) to correct for errors in the slicer decision 354.

Additionally, the FEC decoder 308 produces a decoder information signal 362 based on the slicer decision 354 to communicate information to the coefficient generator 312.

The FEC decoder 308 may communicate signal parameters such as code information, state information, symbols or bits which are determined to be incorrect or questionable, likely corrected values for such symbols or bits, probabilities for suggested corrections or a multiplicity of possible choices for a correction, likelihood metrics related to estimated signal fidelity corresponding to a segment of the slicer decision 354, or any other suitable signal parameter to the coefficient generator 312.

The noise analyzer 310 analyzes the noise and/or interference 250 impressed onto the communication signal 350 to produce a coefficient selection signal 356. More specifically, the noise analyzer 310 characterizes the composition of the noise and/or interference 250 embedded within the received communication signal 154 at a given time, and selects for training, selects for application, or selects for both training and application the coefficient selection signal 356 corresponding with the composition of the noise and/or interference 250. In an exemplary embodiment, the noise analyzer 310 characterizes the composition of the noise and/or interference 250 based on the slicer information signal 360 and/or the decoder information signal 362. However, this example is not limiting, the noise analyzer 310 may characterize the composition of the noise and/or interference 250 embedded within the received communication signal 154 based on the slicer information signal 360, the decoder information signal 362, the communication signal 350, and/or any combination thereof. The noise analyzer 310 is further described in FIG. 9.

The coefficient generator 312 produces the equalization coefficients 358 based on the communication signal 350, the coefficient selection signal 356, the slicer information signal 360, and/or the decoder information signal 362. The coefficient generator 312 may transmit the equalization coefficients 358 to the adaptive equalizer 304 serially, in parallel, or any other suitable format. The adaptive equalizer 304 adaptively adjusts an impulse response according to the equalization coefficients 358 to compensate for the interference and/or the distortion in the presence of the noise and/or interference 250 having one or more time-varying noise and/or interference conditions.

Figure 4A:
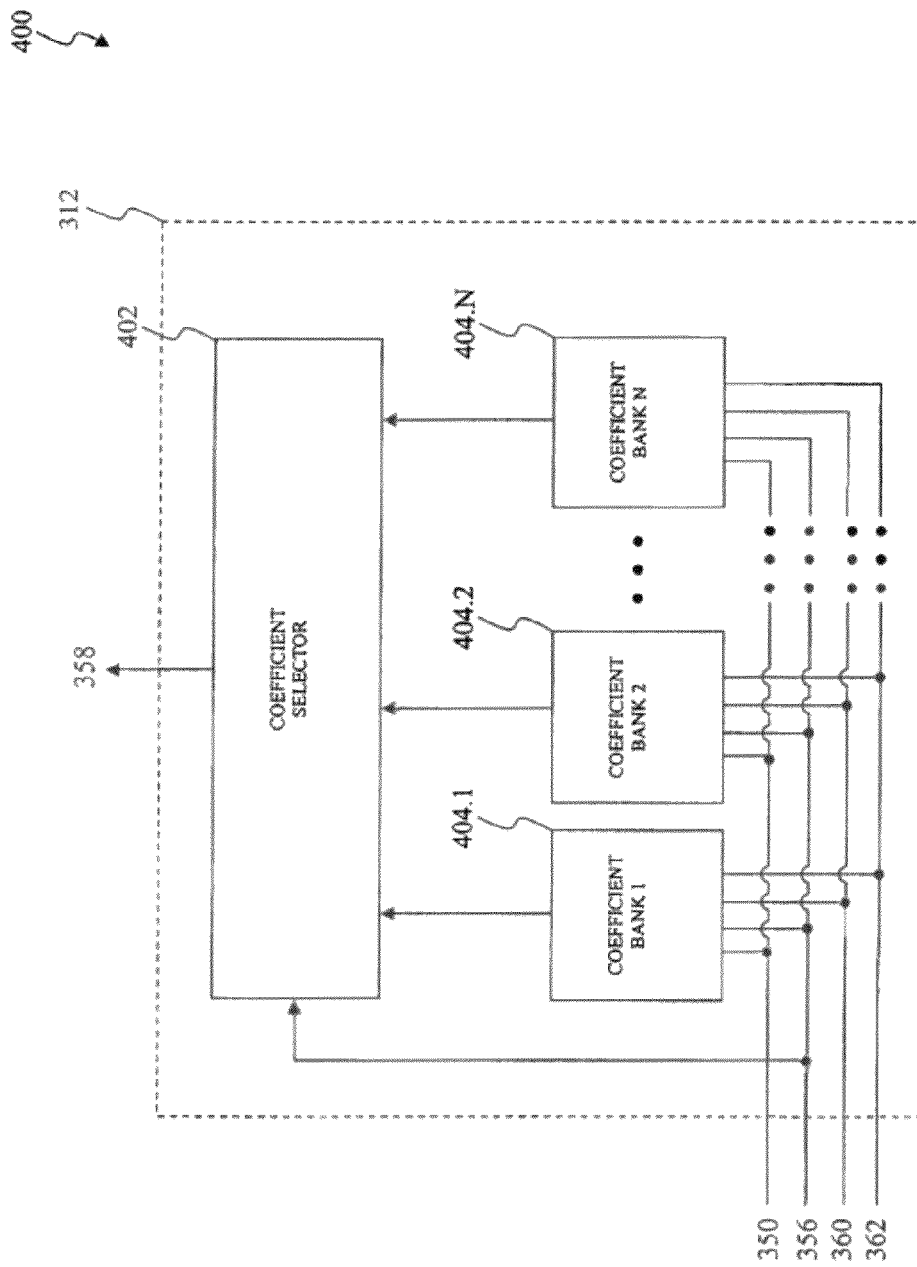
FIG. 4A illustrates a block diagram of a coefficient generator used in the receiver according to an exemplary embodiment of the present invention.

FIG. 4A illustrates a block diagram 400 of a coefficient generator used in the receiver according to an exemplary embodiment of the present invention. The block diagram 400 is an exemplary representation of the coefficient generator 312 as shown in FIG. 3. The coefficient generator 312 produces the equalization coefficients 358 used by the adaptive equalizer 304 to compensate for the noise and/or interference 250 in the presence of the one or more time-varying noise and/or interference conditions.

As shown in FIG. 4A, the coefficient generator 312 includes a coefficient selector 402 and a coefficient bank 404. The coefficient bank 404 includes N coefficient banks 404.1 through 404.N to store N unique sets of equalization coefficients corresponding to the composition of the noise and/or interference 250. For example, when the noise and/or interference 250 includes a single time-varying noise and/or interference condition, the adaptive equalizer 304 compensates for the noise and/or interference 250 using the equalization coefficients stored in coefficient bank 404.1. Likewise, when the noise and/or interference 250 does not include the single time-varying noise and/or interference condition, the adaptive equalizer 304 compensates the noise and/or interference 250 using the equalization coefficients stored in coefficient bank 404.2.

Although the coefficient bank 404 is described herein as storing equalization coefficients to allow the adaptive equalizer 304 to compensate for the noise and/or interference 250 in the presence of a single time-varying noise and/or interference condition, those skilled in the arts will recognize that the coefficient bank 404 may store N sets of equalization coefficients to allow the adaptive equalizer 304 to compensate for the noise and/or interference 250 in the presence and/or absence of the multiple time-varying noise and/or interference conditions without departing from the spirit and scope of the invention. As an example, if the noise and/or interference 250 includes a first time-varying noise and/or interference condition and a second time-varying noise and/or interference condition, equalization coefficients to compensate for no time-varying noise and/or interference conditions may be stored in coefficient bank 404.1, equalization coefficients to compensate for the first time-varying noise and/or interference condition may be stored in coefficient bank 404.2, equalization coefficients to compensate for the second time-varying noise and/or interference condition may be stored in coefficient bank 404.3, and equalization coefficients to compensate for the both the first time-varying noise and/or interference condition and the second time-varying noise and/or interference condition may be stored in coefficient bank 404.4.

The coefficient generator 312 updates the equalization coefficients stored in a corresponding coefficient bank 404.1 through 404.N and/or parameters, such as, but is not limited to a gain coefficient pi to provide an example, of the least-squares algorithm or the suitable equivalent algorithm to compensate for a corresponding time-varying noise and/or interference conditions. The coefficient generator 312 selects the corresponding coefficient bank 404.1 through 404.N to be updated or trained based on the coefficient selection signal 356. For example, when the coefficient selection signal 356 indicates the one or more time-varying noise and/or interference conditions are absent from the noise and/or interference 250, the coefficient generator 312 may update the equalization coefficients stored in the equalization coefficient bank 404.1. The equalization coefficients stored in the remainder of the equalization coefficient banks 404 continue in their current state until selected by the coefficient selection signal 356. Likewise, when the coefficient selection signal 356 indicates the one or more time-varying noise and/or interference conditions are present in the noise and/or interference 250, the coefficient generator 312 updates the equalization coefficients stored in the equalization coefficient bank 404.2. The equalization coefficients stored in the remainder of the equalization coefficient banks 404 continue in their current state until selected by the coefficient selection signal 356. Alternatively, the coefficient generator 312 selects the corresponding parameters, such as the gain coefficient $\mu$ of a conventional LMS adaptive equalizer implementation to provide an example, of the least-squares algorithm or the suitable equivalent algorithm to be updated or trained based on the coefficient selection signal 356. For example, when the coefficient selection signal 356 indicates the absence of the one or more time-varying noise and/or interference conditions are absent from the noise and/or interference 250, the coefficient generator 312 may increase and/or decrease the corresponding parameters of the least-squares algorithm or the suitable equivalent algorithm. Likewise, when the coefficient selection signal 356 indicates the one or more time-varying noise and/or interference conditions are present in the noise and/or interference 250, the coefficient generator 312 may increase and/or decrease the corresponding parameters of the least-squares algorithm or the suitable equivalent algorithm.

The coefficient banks 404.1 through 404.N are updated through the least-squares algorithm, such as the widely known Least Mean Squared (LMS), Recursive Least Squares (RLS), Minimum Mean Squared Error (MMSE) algorithms or the suitable equivalent algorithm that yields a least-squares result based on the communication signal 350, the slicer information signal 360 and/or the decoder information signal 362. In other words, the least-squares algorithm or the suitable algorithm may use the communication signal 350, the slicer information signal 360 and/or the decoder information signal 362 to train the corresponding coefficient bank 404.1 through 404.N to allow the adaptive equalizer 304 to compensate for the noise and/or interference 250 in the presence of the one or more time-varying noise and/or interference conditions. In an exemplary embodiment, the coefficient selection signal 356 may be used to adjust the least-squares algorithm or the suitable equivalent algorithm. For example, the coefficient selection signal 356 may increase a gain coefficient $\mu$ to allow the adaptive equalizer 304 to rapidly compensate for large interferences and/or distortions embedded in the communication signal 350 in the presence of the one or more time-varying noise and/or interference conditions. Likewise, the coefficient selection signal 356 may decrease the gain coefficient $\mu$ for smaller interferences and/or distortions. As another example, with one low duty cycle, high power, noise and/or interference component, the gain coefficient $\mu$ is significantly decreased during the absence of the low duty cycle noise and/or interference, so that the training of the equalizer may be dominated by the time when the low duty cycle noise and/or interference is present. As yet another example, the ratio of $\mu$ assigned when the high power noise and/or interference is present to $\mu$ when it is absent is inverse with the duty cycle, and in another embodiment the ratio is much larger.

The coefficient selector 402 selects a corresponding coefficient bank 404.1 through 404.N based on the coefficient selection signal 356 to produce the equalization coefficients 358. For example, when the coefficient selection signal 356 indicates the one or more time-varying noise and/or interference conditions are absent from the noise and/or interference 250, the coefficient selector 402 may select the equalization coefficients stored in the equalization coefficient bank 404.1. Likewise, when the coefficient selection signal 356 indicates the one or more time-varying noise and/or interference conditions are present in the noise and/or interference 250, the coefficient selector 402 selects the equalization coefficients stored in the equalization coefficient bank 404.2. In an exemplary embodiment, the coefficient selector 402 is optional for a coefficient generator 312 including a single coefficient bank, such as the coefficient bank 404.1.

Figure 4B:
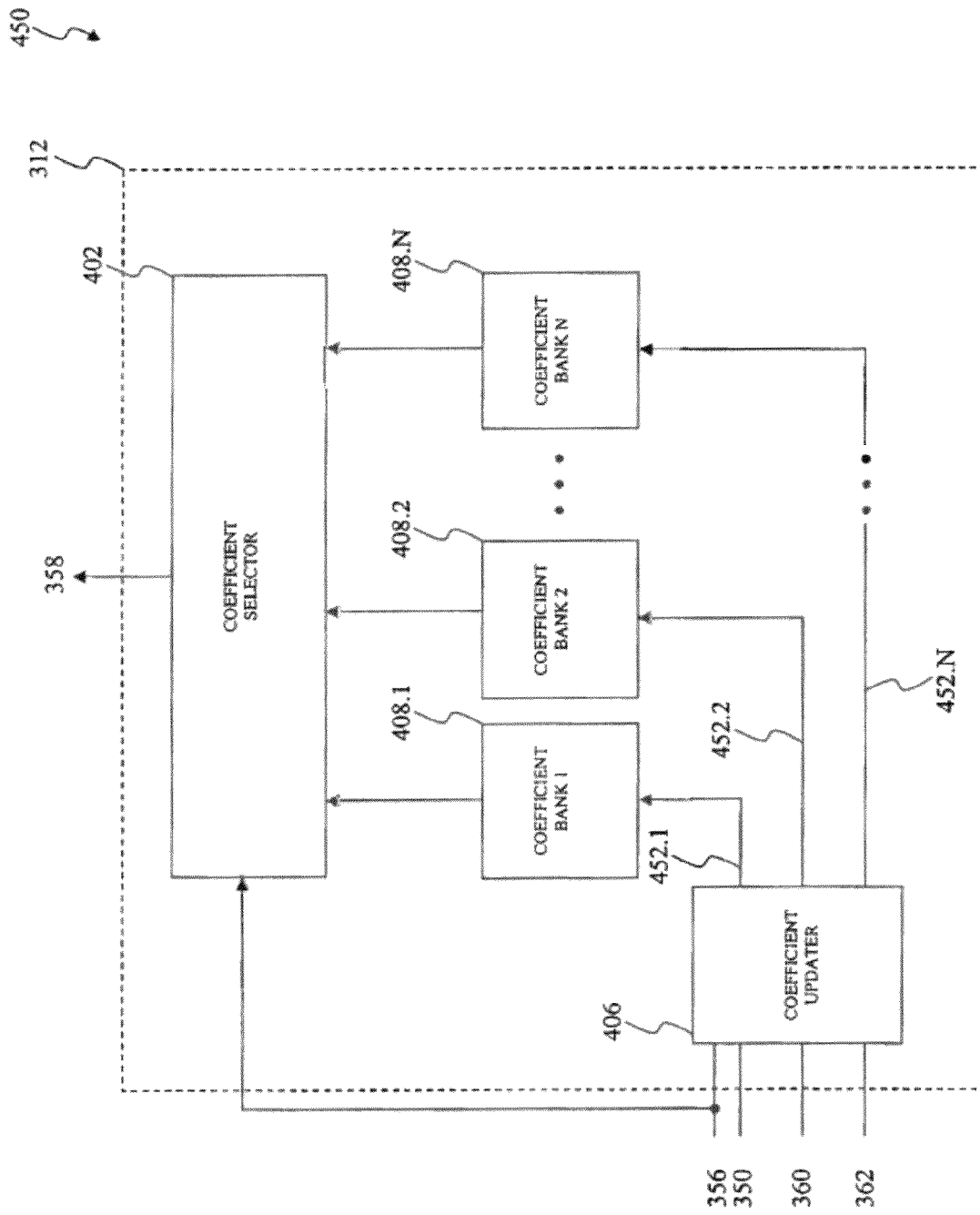
FIG. 4B illustrates a block diagram of a coefficient generator used in the receiver according to another exemplary embodiment of the present invention.

FIG. 4B illustrates a block diagram 450 of a coefficient generator used in the receiver according to another exemplary embodiment of the present invention. The block diagram 450 is an exemplary representation of the coefficient generator 312 as shown in FIG. 3. The coefficient generator 312 produces the equalization coefficients 358 used by the adaptive equalizer 304 to compensate for the noise and/or interference 250 in the presence of the one or more time-varying noise and/or interference conditions.

The coefficient generator 312 as shown in FIG. 4B operates in a substantially similar manner as the coefficient generator shown in FIG. 4A except that the coefficient generator 312 as shown in FIG. 4B includes a coefficient enabler 406 and a coefficient bank 408. The coefficient bank 408 operates in a substantially similar manner as the coefficient bank 404 as shown in FIG. 4A, except the coefficient generator 312, as shown in FIG. 4B, selects the corresponding coefficient bank 408.1 through 408.N to be updated or trained based on an output of the coefficient enabler 406.

The coefficient enabler 406 selects a corresponding coefficient bank 408.1 through 408.N to be updated or trained based upon the coefficient selection signal 356. For example, when the coefficient selection signal 356 indicates the absence of the one or more time-varying noise and/or interference conditions, the coefficient enabler 406 may select the equalization coefficients stored in coefficient bank 408.1 to be updated or trained. The coefficient enabler 406 routes the communication signal 350, the slicer information signal 360, the decoder information signal 362, and/or any combination thereof to the coefficient bank 408.1 via a communication bus 452.1 to train the coefficient bank 408.1. The communication bus 452.1 may contain one or more data lines to route the communication signal 350, the slicer information signal 360, and/or the decoder information signal 362 individually or in any suitable combination. The equalization coefficients stored in the remainder of the equalization coefficient banks 408 continue in their current state until selected by the coefficient selection signal 356. Likewise, when the coefficient selection signal 356 indicates the presence of the one or more time-varying noise and/or interference conditions, the coefficient enabler 406 may select the equalization coefficients stored in coefficient bank 408.2 to be updated or trained. The coefficient enabler 406 routes the communication signal 350, the slicer information signal 360, the decoder information signal 362, and/or any combination thereof to the coefficient bank 408.2 via a communication bus 452.2 to train the coefficient bank 408.2. The communication bus 452.2 may contain one or more data lines to route the communication signal 350, the slicer information signal 360, and/or the decoder information signal 362 individually or in any suitable combination. The equalization coefficients stored in the remainder of the equalization coefficient banks 408 continue in their current state until selected by the coefficient selection signal 356.

Although the coefficient bank 408 is described herein as storing equalization coefficients to allow the adaptive equalizer 304 to compensate for the noise and/or interference 250 in the presence of a single time-varying noise and/or interference condition, those skilled in the arts will recognize that the coefficient bank 408 may store N sets of equalization coefficients to allow the adaptive equalizer 304 to compensate for the noise and/or interference 250 in the presence and/or absence of the multiple time-varying noise and/or interference conditions without departing from the spirit and scope of the invention. The coefficient enabler 406 routes the communication signal 350, the slicer information signal 360, the decoder information signal 362, and/or any combination thereof via a corresponding communication bus 452.1 through 452.N to train a corresponding coefficient bank 408.1 through 408.N.

Figure 5:
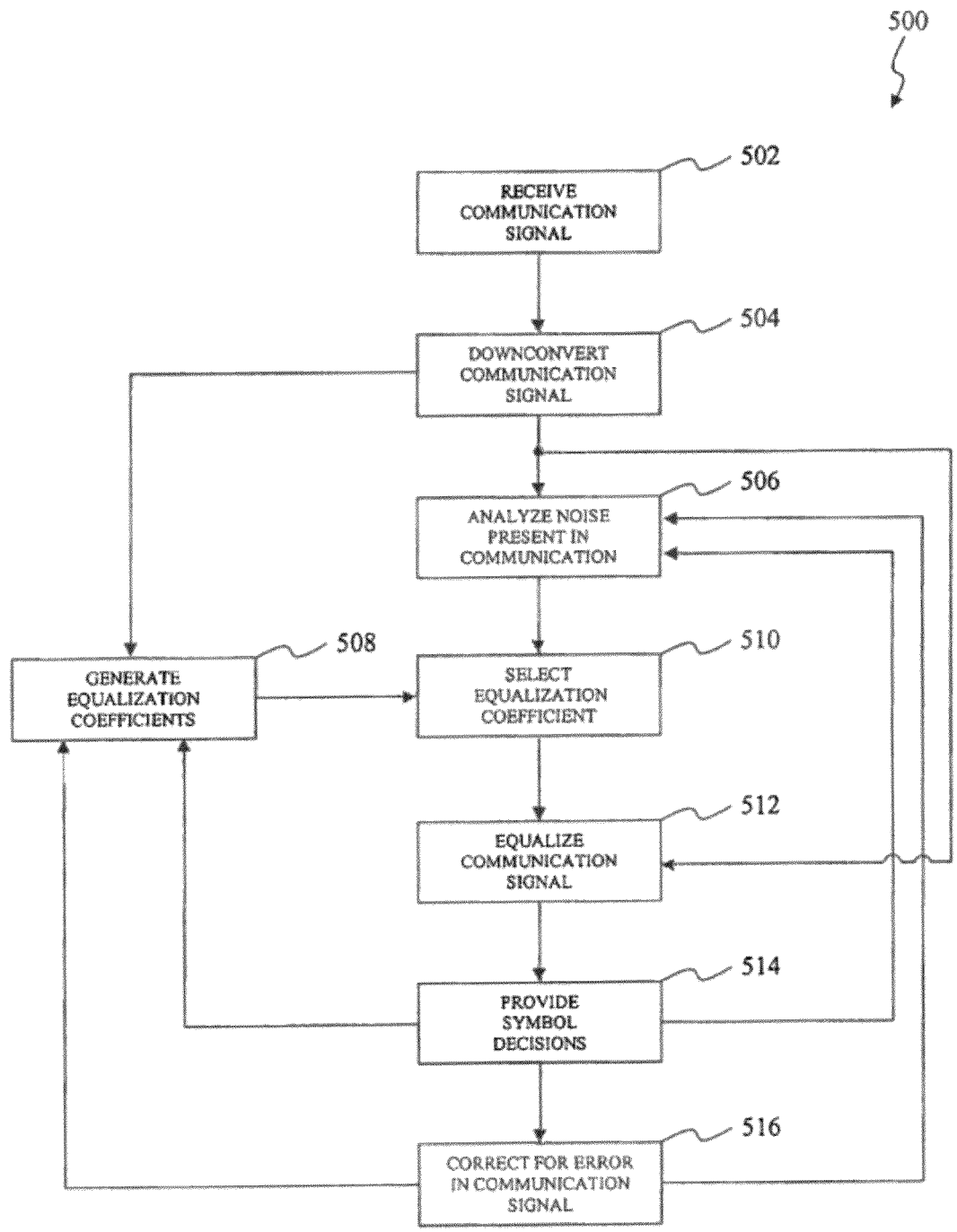
FIG. 5 is a flowchart of exemplary operational steps of a communications receiver according to an aspect of the present invention.

FIG. 5 is a flowchart of exemplary operational steps of a communications receiver according to an aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 5.

At step 502, a communications signal is transmitted by a transmitter and received from a communication channel by a receiver. The transmitter, the communication channel, and/or the receiver embeds a noise and/or interference, such as the noise and/or interference 250, onto a transmitted communications signal causing the received communications signal to differ from the transmitted communications signal. The noise and/or interference may include one or more time-varying noise and/or interference conditions such as a narrowband, high powered component having a low duty cycle and a wider band, lower power component to provide an example.

At step 504, the received communications signal from step 502 is downconverted and/or demodulated to a baseband frequency, an intermediate frequency (IF), or any other suitable frequency using a suitable downconversion process that will be apparent to those skilled in the art(s). At step 504, functions such as, but not limited to, timing recovery, frequency estimation, carrier and/or phase recovery, automatic gain control (AGC) and/or any other parameter estimation may be performed on the received communications signal from step 502.

At step 506, the noise and/or interference embedded within the communications signal from step 504 is analyzed. The analysis of the noise and/or interference embedded within the communications signal from step 504 is further described in FIG. 9. More specifically, the communications receiver characterizes the composition of the noise and/or interference embedded within the communications signal from step 504. Alternatively, the noise and/or interference may be analyzed based on of an communications signal from step 504, an output of step 514, an output of step 516 and/or any combination thereof. As an example, when the one or more time-varying noise and/or interference conditions are present in the noise and/or interference, the communications receiver indicates the presence of the one or more time-varying noise and/or interference conditions to step 510. At step 506, the communications receiver may specifically characterize the composition of the noise and/or interference to indicate specific time-varying noise and/or interference conditions. Likewise, when the specific time-varying noise and/or interference conditions are absent from the noise and/or interference, the communications receiver indicates its absence to step 510.

At step 508, one or more equalization coefficient banks are generated to correct for the noise and/or interference in the presence and/or absence of the one or more time-varying noise and/or interference conditions. The equalization coefficients are updated or trained based a communications signal from step 504, an output of step 514, an output of step 516, and/or any combination thereof. More specifically, the equalization coefficients are updated through a least-squares algorithm, such as the widely known Least Mean Squared (LMS), Recursive Least Squares (RLS), Minimum Mean Squared Error (MMSE) algorithms or any suitable equivalent algorithm that yields a least-squares result based on the communications signal from step 504, the output of step 514, the output of step 516, and/or any combination thereof. In addition, the communications signal from step 504, the output of step 514, the output of step 516, and/or any combination thereof may be used to adjust the least-squares algorithm or the suitable equivalent algorithm. For example, the communications signal from step 504, the output of step 514, the output of step 516, and/or any combination thereof may be used to increase a gain coefficient $\mu$ to allow for rapid compensation for large interferences and/or distortions embedded in the communication signal in the presence of the one or more time-varying noise and/or interference conditions. Likewise, the communications signal from step 504, the output of step 514, the output of step 516, and/or any combination thereof may decrease the gain coefficient $\mu$ for smaller interferences and/or distortions.

At step 510, an equalization coefficient bank and/or one or more suitable parameters from the least-squares algorithm or the suitable equivalent algorithm from step 508 is selected corresponding to the analysis of the noise and/or interference performed in step 506. For example, when the analysis performed in step 506 indicates the one or more time-varying noise and/or interference conditions are absent from the noise and/or interference, step 510 may select the equalization coefficient bank from step 508 corresponding to the absence of the one or more time-varying noise and/or interference conditions. Alternatively, when the analysis performed in step 506 indicates the one or more time-varying noise and/or interference conditions are absent from the noise and/or interference, step 510 may increase and/or decrease the one or more suitable parameters from the least-squares algorithm or the suitable equivalent algorithm corresponding to the absence of the one or more time-varying noise and/or interference conditions. Likewise, when the analysis performed in step 506 indicates the one or more time-varying noise and/or interference conditions are present in the noise and/or interference, step 510 may select the equalization coefficient bank from step 508 corresponding to that particular time-varying noise and/or interference condition. Alternatively, when the analysis performed in step 506 indicates the one or more time-varying noise and/or interference conditions are present in the noise and/or interference, step 510 may increase and/or decrease the one or more suitable parameters from the least-squares algorithm or the suitable equivalent algorithm corresponding to the presence of the one or more time-varying noise and/or interference conditions.

At step 512, the noise and/or interference embedded within the communications signal from step 504 in the presence and/or absence of the one or more time-varying noise and/or interference conditions is compensated for using the equalization coefficients and/or the adjustments to the least-squares algorithm or the suitable equivalent algorithm from step 510. More specifically, step 512 adaptively adjusts an impulse response of an adaptive equalizer according to the equalization coefficients and/or the adjustments to the least-squares algorithm or the suitable equivalent algorithm from step 510 to compensate for the noise and/or interference in the presence and/or absence of the one or more time-varying noise and/or interference conditions.

At step 514, symbol decisions regarding the communications signal from step 512 are provided. The symbol decisions may include a hard decision or a soft decision. When providing the hard decision, step 514 compares the equalized communication signal from step 512 to a threshold and assigns a digital value based on the comparison to produce the hard decision. The threshold value may be adjusted according to the encoding of the transmitted communication signal. For example, if the transmitted communication signal is encoded according to a non-return-to-zero (NRZ) scheme, the threshold value may be assigned to the statistical mean of the positive and negative amplitudes representing the symbols binary one and binary zero. The symbols of the equalized communication signal from step 512 that are greater than the threshold value may be assigned to binary one, while the symbols of the equalized communication signal from step 512 that are less than the threshold value are assigned to binary zero. Alternatively, the slicer 306 may incorporate other information, such as the slicer error, the BER, the SER, the SNR, or any other suitable signal parameter into the hard decision to produce the soft decision.

At step 516, the communications signal from step 514 is error corrected. The errors in the communications signal from step 514 may result from, but are not limited to, the equalized communication signal from step 512, the downconverting and/or demodulating of the communications signal from step 502, or the digitization of the communications signal from step 512 to provide some examples. Step 516 may be implemented using any decoding scheme, such as a block decoding scheme, such as Reed-Solomon decoding, a convolutional decoding scheme, such as the Viterbi algorithm, a concatenated decoding scheme involving inner and outer codes, or decoding schemes using iterative decoding, and/or any other suitable decoding scheme that will be apparent to those skilled in the art(s) to correct for errors.

Figure 6A:
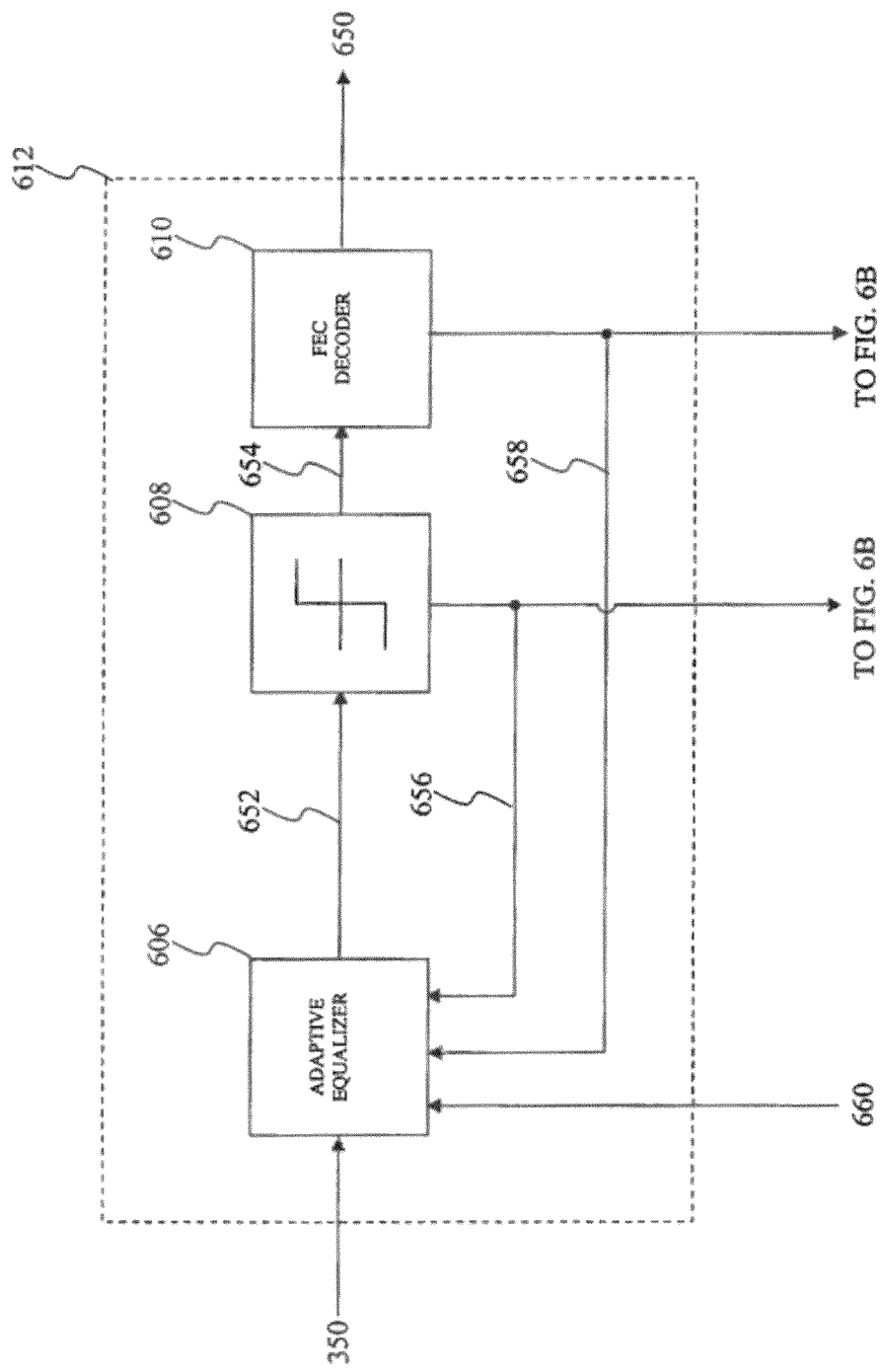
FIG. 6A illustrates a block diagram of an adaptive equalizer used in the communication system according to an exemplary embodiment of the present invention.

FIG. 6A illustrates a block diagram of an adaptive equalizer used in the communication system according to an exemplary embodiment of the present invention. An adaptive equalizer 612 is an exemplary embodiment of an individual adaptive equalizer in the adaptive equalizer bank 602 to be discussed in FIG. 6B.

The adaptive equalizer 606 compensates for the noise and/or interference 250 in the presence of the one or more time-varying noise and/or interference conditions embedded in the communication signal 350 to produce an equalized communication signal 652. In the presence of the noise and/or interference 250 including one or more time-varying noise and/or interference conditions, the equalized communication signal 652 includes substantially less interference and distortion when compared to the communication signal 350. More specifically, the adaptive equalizer 606 adaptively adjusts an impulse response according to the communication signal 350, the slicer information signal 656, the decoder information signal 658, and/or any combination thereof to compensate for the interference and/or the distortion in the presence of the noise and/or interference 250 including one or more time-varying noise and/or interference conditions. The adaptive equalizer 606 may be implemented as, but is not limited to, a decision feedback equalizer (DFE), a feed forward equalizer (FFE), any suitable interference cancellation circuit, a concatenation of an interference cancellation circuit and/or adaptive equalizer, and/or any combination thereof.

The adaptive equalizer 606 updates equalization coefficients to compensate for the interference and/or the distortion for a corresponding time-varying noise and/or interference condition based on the equalizer selection signal 660. For example, when the equalizer selection signal 660 is active, the adaptive equalizer 606 may update the equalization coefficients using to the slicer information signal 656 and/or the decoder information signal 658, whereas, the adaptive equalizer 606 does not update the equalization coefficients when the equalizer selection signal 660 is inactive. The equalization coefficients for the adaptive equalizer 606 are updated with a least-squares algorithm, such as the widely known Least Mean Squared (LMS), Recursive Least Squares (RLS), Minimum Mean Squared Error (MMSE) algorithms or any suitable equivalent algorithm that yields a least-squares result. In other words, the least-squares algorithm or the suitable equivalent may train the adaptive equalizer 606 to allow the adaptive equalizer 612 to compensate for the interference and/or the distortion resulting from the noise and/or interference 250 in the presence and/or absence of the one or more time-varying noise and/or interference conditions.

The slicer 608 provides decisions based on the equalized communication signal 652 to produce a digitized communication signal 654. The slicer 608 as shown in FIG. 6A operates in a substantially similar manner as the slicer 306 shown in FIG. 3. Similar to the slicer 306, the slicer 608 produces a slicer information signal 656 based on the equalized communication signal 652 to communicate information to the adaptive equalizer 606. The slicer information signal 656 may be used by the noise analyzer 614 to analyze the interference and/or the distortion caused by the transmitter 102, the communication channel 104, and/or the receiver 106 impressed onto the communication signal 350 as to be further discussed in FIG. 6B. The slicer 608 may communicate signal parameters such as the slicer error, the BER, the SNR, or any other suitable signal parameter to the adaptive equalizer 606.

The forward error correction (FEC) decoder 610 enables the communications receiver 106 to correct for errors in the digitized communication signal 654 to produce the equalized communication signal 650. The FEC decoder 610 as shown in FIG. 6A operates in a substantially similar manner as the FEC decoder 308 shown in FIG. 3. In an exemplary embodiment, the FEC decoder is optional; the slicer 608 directly generates the equalized communication signal 650. Additionally, the FEC decoder 610 produces a decoder information signal 658 based on the digitized communication signal 654 to communicate information to the adaptive equalizer 606. The decoder information signal 658 may be used by the noise analyzer 614 to analyze the interference and/or the distortion caused by the interference and/or the distortion resulting from the noise and/or interference 250 impressed onto the communication signal 350 as to be further discussed in FIG. 6B. The FEC decoder 308 may communicate signal parameters such as code information, state information, symbols or bits which are determined to be incorrect or questionable, likely corrected values for such symbols or bits, probabilities for suggested corrections or a multiplicity of possible choices for a correction, likelihood metrics related to estimated signal fidelity corresponding to a segment of the decoder information signal 658, or any other suitable signal parameter to the coefficient generator 312 to the adaptive equalizer 606.

Figure 6B:
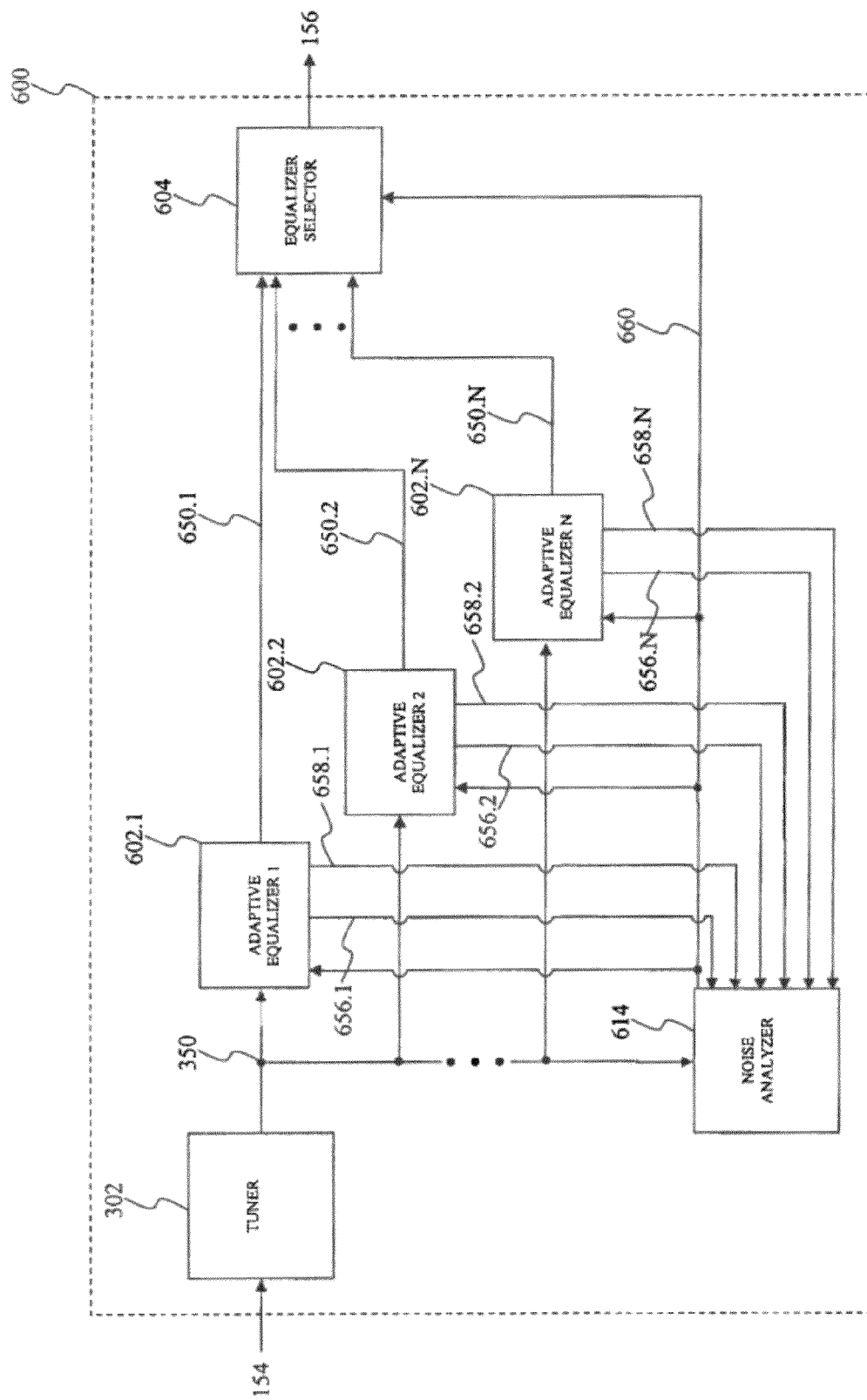
FIG. 6B illustrates a block diagram of a communications receiver used in the communication system according to another exemplary embodiment of the present invention.

FIG. 6B illustrates a block diagram of a communications receiver used in the communication system according to another exemplary embodiment of the present invention. The communications receiver 600 is another exemplary embodiment of the communications receiver 106 as shown in FIG. 1 and FIG. 2. The communications receiver 600 receives the received communication signal 154 from the communication channel 104. The received communication signal 154 includes the interference and/or the distortion resulting from the noise and/or interference 250. The noise and/or interference 250 may include one or more time-varying noise and/or interference conditions. The communications receiver 600 may compensate for the interference and/or the distortion impressed onto the transmitted communication signal 152 by the transmitter 102, the communication channel 104, and/or the receiver 106 in the presence of the one or more time-varying noise and/or interference conditions.

The communications receiver 600 includes the communications tuner 302, an adaptive equalizer bank 602, and an equalizer selector 604, and a noise analyzer 614. From the previous discussion of FIG. 3, the communications tuner 302 operates upon the received communication signal 154 to produce the communication signal 350.

As shown in FIG. 6B, the noise analyzer 614 analyzes the noise and/or interference 250 impressed onto the communication signal 350 to produce an equalizer selection signal 660. The noise analyzer 614 as shown in FIG. 6B operates in a substantially similar manner as the noise analyzer 310 as shown in FIG. 3. The noise analyzer 614 characterizes the composition of the noise and/or interference 250 embedded within the received communication signal 154 based on corresponding slicer information signals 656.1 through 656.N, corresponding decoder information signals 658.1 through 658.N, the communication signal 350, and/or any combination thereof.

The adaptive equalizer bank 602 comprises N adaptive equalizers 602.1 through 602.N to compensate for the interference and/or the distortion embedded in the communication signal 350 for a corresponding time-varying noise and/or interference condition to produce a corresponding equalized communication signal 650.1 through 650.N. The adaptive equalizer bank 602 may additionally include one or more remodulation functions as disclosed in U.S. patent application Ser. No. 10/163,871, entitled "Receiver Having Decisional Feedback Equalizer with Remodulation and Related Methods," filed on Jun. 7, 2002, now U.S. Pat. No. 6,690,753, which is incorporated by reference in its entirety. The communications receiver 600 selects a corresponding adaptive equalizer 602.1 through 602.N based on the equalizer selection signal 660. As an example, the equalizer selection signal 660 may be used to select the adaptive equalizer 602.1 to compensate for the interference and/or the distortion embedded in the communication signal 350 in the absence of the one or more time-varying noise and/or interference conditions. Likewise, the equalizer selection signal 660 may be used to select the adaptive equalizer 602.2 to compensate for the interference and/or the distortion in the presence of a single time-varying noise and/or interference conditions embedded in the communication signal 350.

Although the adaptive equalizer bank 602 is described herein compensating for the noise and/or interference 250 in the presence of a single time-varying noise and/or interference condition, those skilled in the arts will recognize that the adaptive equalizer bank 602 is described herein compensating for the noise and/or interference 250 in the presence and/or absence of multiple time-varying noise and/or interference conditions without departing from the spirit and scope of the invention. As an example, if the noise and/or interference 250 includes a first time-varying noise and/or interference condition and a second time-varying noise and/or interference condition, the adaptive equalizer 602.1 may be used to compensate for the interference and/or the distortion in the absence of the first time-varying noise and/or interference condition and the second time-varying noise and/or interference condition, the adaptive equalizer 602.2 may be used to compensate for the interference and/or the distortion in the presence of the first time-varying noise and/or interference condition, the adaptive equalizer 602.3 may be used to compensate for the interference and/or the distortion in the presence of the second time-varying noise and/or interference condition, and the adaptive equalizer 602.4 may be used to compensate for the interference and/or the distortion in the presence of the first time-varying noise and/or interference condition and the second time-varying noise and/or interference condition.

The equalizer selector 604 selects a corresponding equalized communication signal 650.1 through 650.N based on the equalizer selection signal 660 to produce the digital communication signal 156. For example, when the equalizer selection signal 660 indicates the absence of a single time-varying noise and/or interference condition, the equalizer selector 604 may select the equalized communication signal 650.1 as the digital communication signal 156. Likewise, when the equalizer selection signal 660 indicates the presence of a single time-varying noise and/or interference condition, the equalizer selector 604 may select the equalized communication signal 650.2 as the digital communication signal 156. Alternatively, the equalizer selection signal 660 may indicate to one or more non-selected adaptive equalizers to slow coefficient adaptation, and/or modify coefficients and/or their adaptation, and/or re-instate coefficients from an earlier time, and/or even inhibit their adaptation. For example, the adaptive equalizer bank 602 and/or the noise analyzer 614 may store equalization coefficients in a memory storage device, such as an external memory, such as a random access memory (RAM) to provide some examples, a register bank, and/or any other suitable storage device capable of storing and/or retrieving data. The adaptive equalizer bank 602 and/or the noise analyzer 614 may re-instate the stored equalization coefficients to the one or more non-selected adaptive equalizers. In another embodiment, one or more of the non-selected adaptive equalizers continue to produce slicer outputs, or even FEC decoding results, irrespective of training their coefficients.

Figure 7A:
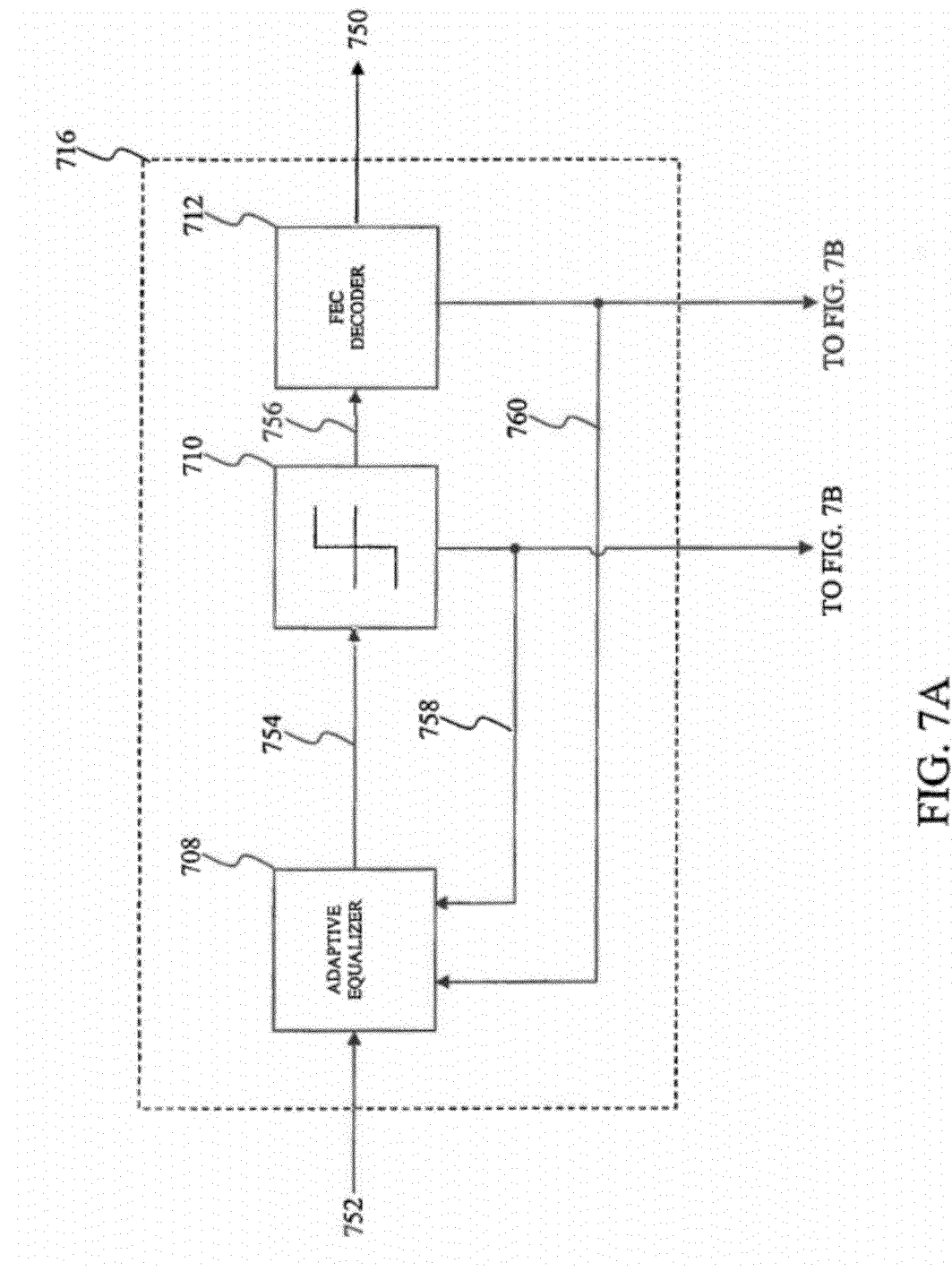
FIG. 7A illustrates a block diagram of an adaptive equalizer used in the communication system according to another exemplary embodiment of the present invention.

FIG. 7A illustrates a block diagram of an adaptive equalizer used in the communication system according to another exemplary embodiment of the present invention. An adaptive equalizer 716 is an exemplary embodiment of a single adaptive equalizer in the adaptive equalizers 704.1 through 704.N to be discussed in FIG. 7B.

The adaptive equalizer 708 compensates for the noise and/or interference 250 in the presence of the one or more time-varying noise and/or interference conditions embedded in the communication signal 752 to produce an equalized communication signal 754. In the presence of the noise and/or interference 250 including the one or more time-varying noise and/or interference conditions, the equalized communication signal 754 includes substantially less interference and distortion when compared to the communication signal 752. More specifically, the adaptive equalizer 708 adaptively adjusts an impulse response according to the communication signal 752, the slicer information signal 758, the decoder information signal 760, and/or any combination thereof to compensate for the interference and/or the distortion in the presence of the noise and/or interference 250 including the one or more time-varying noise and/or interference conditions. The adaptive equalizer 708 may be implemented as, but is not limited to, a decision feedback equalizer (DFE), a feed forward equalizer (FFE), any suitable interference cancellation circuit, a concatenation of an interference cancellation circuit and/or adaptive equalizer, and/or any combination thereof.

The adaptive equalizer 708 updates equalization coefficients to compensate for the interference and/or the distortion for a corresponding time-varying noise and/or interference condition. The equalization coefficients for the adaptive equalizer 708 are updated through a least-squares algorithm, such as the widely known Least Mean Squared (LMS), Recursive Least Squares (RLS), Minimum Mean Squared Error (MMSE) algorithms or any suitable equivalent algorithm that yields a least-squares result. In other words, the least-squares algorithm or the suitable equivalent may train the adaptive equalizer 708 to allow the adaptive equalizer 716 to compensate for the interference and/or the distortion resulting from the noise and/or interference 250 in the presence and/or absence of the one or more time-varying noise and/or interference conditions.

Figure 7B:
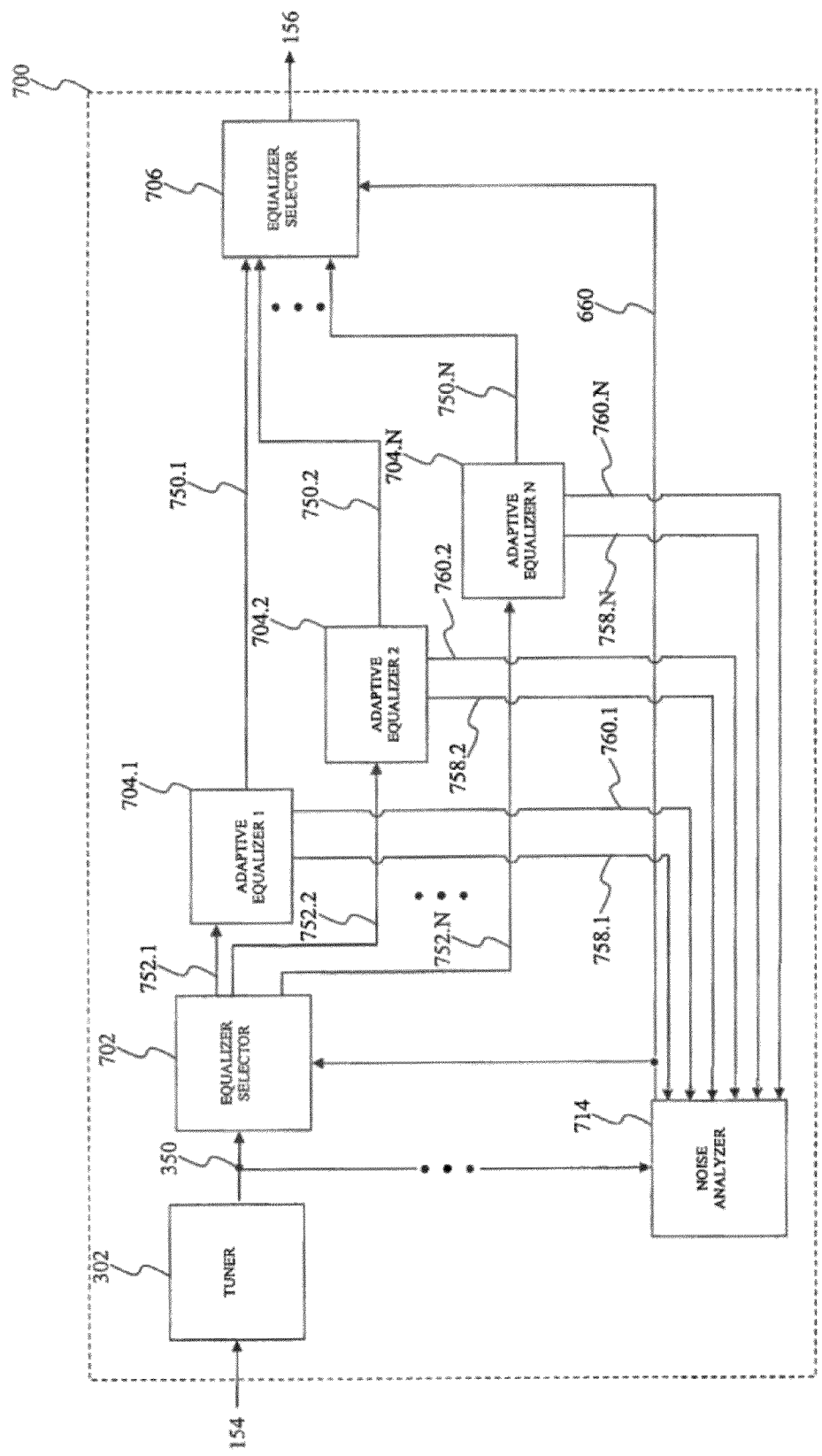
FIG. 7B illustrates a block diagram of a communications receiver used in the communication system according to a further exemplary embodiment of the present invention.

The slicer 710 provides decisions based on the equalized communication signal 754 to produce a digitized communication signal 756. The slicer 710 as shown in FIG. 7B operates in a substantially similar manner as the slicer 306 shown in FIG. 3. Additionally, the slicer 710 produces a slicer information signal 758 based on the equalized communication signal 754 to communicate information to the adaptive equalizer 708. The slicer information signal 758 may be used by the noise analyzer 714 to analyze the interference and/or the distortion caused by the transmitter 102, the communication channel 104, and/or the receiver 106 impressed onto the communication signal 752 as to be further discussed in FIG. 7B. The slicer 710 may communicate signal parameters such as the BER, the SER, the SNR or any other suitable signal parameter to the adaptive equalizer 708.

The forward error correction (FEC) decoder 712 enables the communications receiver 106 to correct for errors in the digitized communication signal 756 to produce the equalized communication signal 752. In an exemplary embodiment, the FEC decoder 712 is optional; the slicer 710 directly generates the equalized communication signal 752. The FEC decoder 712 as shown in FIG. 7B operates in a substantially similar manner as the FEC decoder 308 shown in FIG. 3. Additionally, the FEC decoder 712 produces a decoder information signal 760 based on the digitized communication signal 756 to communicate information to the adaptive equalizer 708.

The decoder information signal 760 may be used by the noise analyzer 714 to analyze the interference and/or the distortion caused by the interference and/or the distortion resulting from the noise and/or interference 250 impressed onto the communication signal 752 as to be further discussed in FIG. 7B. The FEC decoder 712 may communicate signal parameters such as code information, state information, symbols or bits which are determined to be incorrect or questionable, likely corrected values for such symbols or bits, probabilities for suggested corrections or a multiplicity of possible choices for a correction, likelihood metrics related to estimated signal fidelity corresponding to a segment of the digitized communication signal 756, or any other suitable signal parameter to the adaptive equalizer 708.

FIG. 7B illustrates a block diagram of a communications receiver used in the communication system according to a further exemplary embodiment of the present invention. The communications receiver 700 is a further exemplary embodiment of the communications receiver 106 as shown in FIG. 1 and FIG. 2. The communications receiver 700 receives the received communication signal 154 from the communication channel 104. The received communication signal 154 includes the interference and/or the distortion resulting from the noise and/or interference 250. The noise and/or interference 250 may include the one or more time-varying noise and/or interference conditions. The communications receiver 700 may compensate for the interference and/or the distortion impressed onto the transmitted communication signal 152 by the transmitter 102, the communication channel 104, and/or the receiver 106 in the presence of the one or more time-varying noise and/or interference conditions.

The communications receiver 700 as shown in FIG. 7 operates in a substantially similar manner as the communications receiver 600 except that the communications receiver 700 contains an additional equalizer selector. As shown in FIG. 7B, the communications receiver 700 includes the communications tuner 302, an equalizer enabler 702, an adaptive equalizer bank 704, an equalizer selector 706, and a noise analyzer 714. From the previous discussion of FIG. 3, the communications tuner 302 downconverts the received communication signal 154 to produce a communication signal 350.

As shown in FIG. 7B, the noise analyzer 714 analyzes the noise and/or interference 250 impressed onto the communication signal 350 to produce the equalizer selection signal 660. The noise analyzer 714 as shown in FIG. 7B operates in a substantially similar manner as the noise analyzer 310 as shown in FIG. 3. The noise analyzer 714 characterizes the composition of the noise and/or interference 250 embedded within the received communication signal 154 based on corresponding slicer information signals 758.1 through 758.N, corresponding decoder information signals 760.1 through 760.N, the communication signal 350, and/or any combination thereof.

The adaptive equalizer bank 704 comprises N adaptive equalizers 704.1 through 704.N to compensate for the interference and/or the distortion embedded in the communication signal 350 for a corresponding time-varying noise and/or interference condition to produce a corresponding equalized communication signal 750.1 through 750.N.

The coefficient enabler 702 selects a corresponding adaptive equalizer 704.1 through 704.N to be updated or trained based upon the equalizer selection signal 660. For example, when the equalizer selection signal 660 indicates the absence of the one or more time-varying noise and/or interference conditions, the coefficient enabler 702 may select the equalization coefficients stored in the adaptive equalizer 704.1 to be updated or trained. The coefficient enabler 702 routes the communication signal 350 to the adaptive equalizer 704.1 via a communication bus 752.1 to train the adaptive equalizer 704.1. The equalization coefficients stored in the remainder of the adaptive equalizers 704 continue in their current state until selected by the equalizer selection signal 660. Likewise, when the equalizer selection signal 660 indicates the presence of the one or more time-varying noise and/or interference conditions, the coefficient enabler 702 may select the equalization coefficients stored in the adaptive equalizer 704.2 to be updated or trained. The coefficient enabler 702 routes the communication signal 350 to the adaptive equalizer 704.2 via a communication bus 752.2 to train the adaptive equalizer 704.2. The equalization coefficients stored in the remainder of the adaptive equalizers 704 continue in their current state until selected by the equalizer selection signal 660.

Although the adaptive equalizer 704 is described herein as storing equalization coefficients to allow the adaptive equalizer 704 to compensate for the noise and/or interference 250 in the presence of a single time-varying noise and/or interference condition, those skilled in the arts will recognize that the adaptive equalizer 704 may store N sets of equalization coefficients to compensate for the noise and/or interference 250 in the presence and/or absence of the multiple time-varying noise and/or interference conditions without departing from the spirit and scope of the invention. The coefficient enabler 702 routes the communication signal 350 via a corresponding communication bus 752.1 through 752.N to train a corresponding adaptive equalizer 704.1 through 704.N.

The equalizer selector 704 selects a corresponding equalized communication signal 750.1 through 750.N based on the equalizer selection signal 660 to produce the digital communication signal 156. For example, when the equalizer selection signal 660 indicates the absence of a single time-varying noise and/or interference condition, the equalizer selector 704 may select the equalized communication signal 750.1 as the digital communication signal 156. Likewise, when the equalizer selection signal 660 indicates the presence of a single time-varying noise and/or interference condition, the equalizer selector 704 may select the equalized communication signal 750.2 as the digital communication signal 156. Alternatively, the equalizer selection signal 660 and/or the coefficient enabler 702 may indicate to one or more non-selected adaptive equalizers to slow coefficient adaptation, and/or modify coefficients and/or their adaptation, and/or re-instate coefficients from an earlier time, and/or even inhibit their adaptation. For example, the adaptive equalizers 704 and/or the noise analyzer 714 may store equalization coefficients in a memory storage device, such as an external memory, such as a random access memory (RAM) to provide some examples, a register bank, and/or any other suitable storage device capable of storing and/or retrieving data. The adaptive equalizers 704 and/or the noise analyzer 714 may re-instate the stored equalization coefficients to the one or more non-selected adaptive equalizers. In an embodiment where coefficient adaptation may continue but in a slowed or modified manner, the communication bus 752.N may provide the communication signal to the one or more non-selected adaptive equalizers. In another embodiment, the one or more of the non-selected adaptive equalizers continue to produce slicer outputs, or even FEC decoding results, irrespective of training their coefficients.

Figure 8:
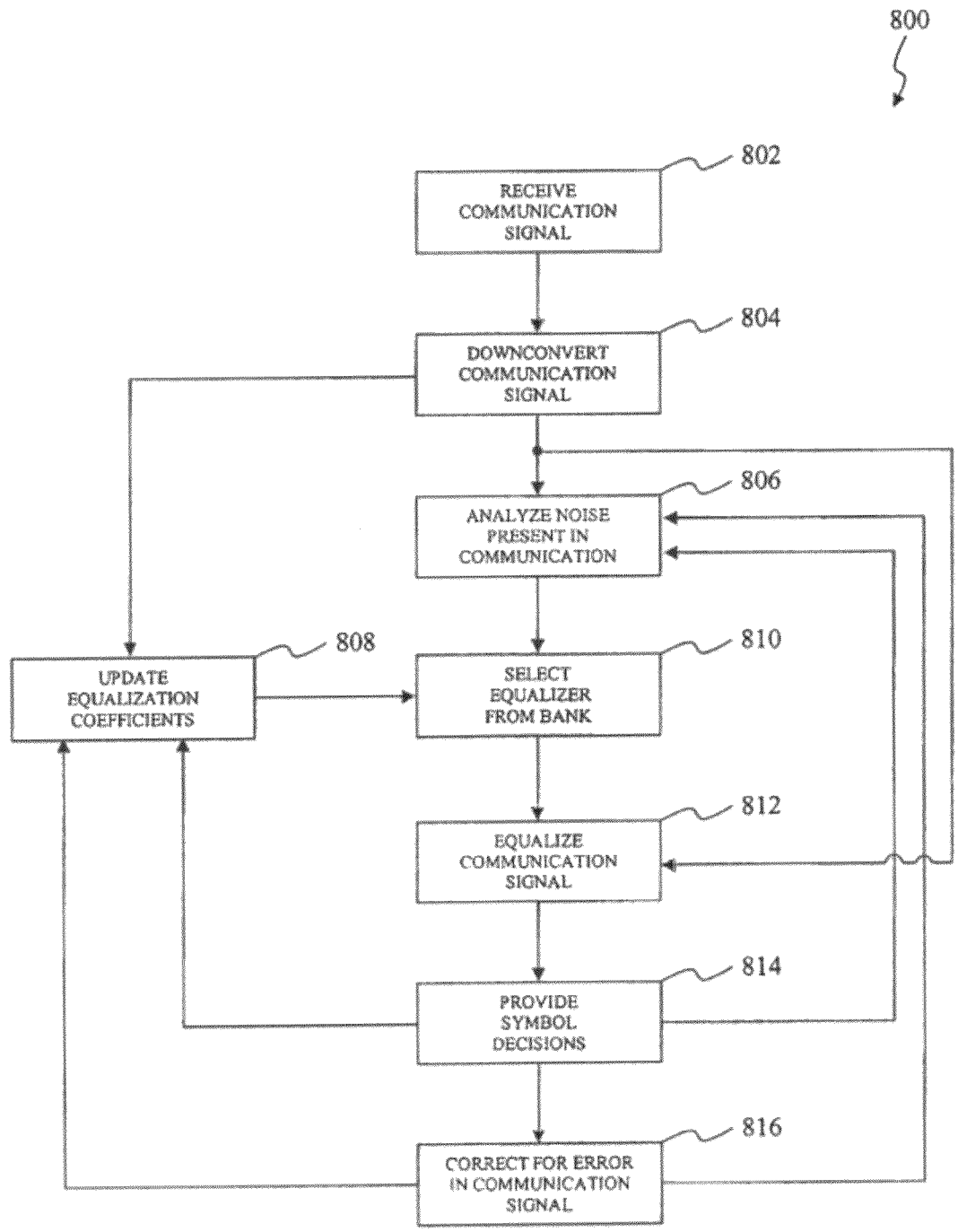
FIG. 8 is a flowchart of exemplary operational steps of a communications receiver according to another aspect of the present invention.

FIG. 8 is a flowchart of exemplary operational steps of a communications receiver according to another aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 8.

At step 802, a communications signal is transmitted by a transmitter and received from a communication channel by a receiver. The transmitter, the communication channel, and/or the receiver embeds a noise and/or interference, such as the noise and/or interference 250, onto a transmitted communications signal causing the received communications signal to differ from the transmitted communications signal. The noise and/or interference may include one or more time-varying noise and/or interference conditions such as a narrowband, high powered component having a low duty cycle and a wider band, lower power component to provide an example.

At step 804, the communications signal from step 802 is downconverted and/or demodulated to a baseband frequency, an intermediate frequency (IF), or any other suitable frequency using a suitable downconversion process that will be apparent to those skilled in the art(s). At step 804, functions such as, but not limited to, timing recovery, frequency estimation, carrier and/or phase recovery, automatic gain control (AGC) and/or any other parameter estimation may be performed on the received communications signal from step 802.

At step 806, the noise and/or interference embedded within the communications signal from step 804 is analyzed. The analysis of the noise and/or interference embedded within the communications signal from step 504 is further described in FIG. 9. More specifically, the communications receiver characterizes the composition of the noise and/or interference embedded within the communications signal from step 804. Alternatively, the noise and/or interference may be analyzed based on the communications signal from step 804, an output of step 814, an output of step 816 and/or any combination thereof. As an example, when the one or more time-varying noise and/or interference conditions are present in the noise and/or interference, the communications receiver indicates the presence of the one or more time-varying noise and/or interference conditions to step 810. At step 806, the communications receiver may specifically characterize the composition of the noise and/or interference to indicate specific time-varying noise and/or interference conditions. Likewise, when the specific time-varying noise and/or interference conditions are absent from the noise and/or interference, the communications receiver indicates its absence to step 810.

At step 808, the equalization coefficients for the adaptive equalizer selected in step 810 are generated to correct for the interference and/or the distortion embedded within the communications signal from step 804 in the presence and/or absence of the one or more time-varying noise and/or interference conditions. The equalization coefficients are updated or trained based an output of step 814 and/or an output of step 816. More specifically, the equalization coefficients are updated through a least-squares algorithm, such as the widely known widely known Least Mean Squared (LMS), Recursive Least Squares (RLS), Minimum Mean Squared Error (MMSE) algorithms or any suitable equivalent algorithm that yields a least-squares result based on the output of step 814 and/or the output of step 816.

At step 810, an adaptive equalizer from an adaptive equalizer bank is selected corresponding to the analysis of the interference and/or the distortion performed in step 806. For example, when the analysis performed in step 806 indicates the absence of the one or more time-varying noise and/or interference conditions, step 810 may select a corresponding adaptive equalizer from the adaptive equalizer bank corresponding to the absence of the one or more time-varying noise and/or interference conditions. Likewise, when the analysis performed in step 806 indicates the presence of the one or more time-varying noise and/or interference conditions, step 810 may select another corresponding adaptive equalizer from the adaptive equalizer bank corresponding to that particular time-varying noise and/or interference condition.

At step 812, the distortion and/or interference in the presence and/or absence of the one or more time-varying noise and/or interference conditions embedded within the communications signal from step 804 is compensated for using the adaptive equalizer selected in step 810. More specifically, step 812 adaptively adjusts an impulse response of the adaptive equalizer selected in step 810 according to the equalization coefficients from step 808 to compensate for the interference and/or the distortion in the presence and/or absence of the one or more time-varying noise and/or interference conditions.

At step 814, symbol decisions regarding the communications signal from step 812 are provided. In particular, the symbol decisions may include a hard decision or a soft decision. When providing the hard decision, step 814 compares the communications signal from step 812 to a threshold and assigns a digital value based on the comparison. The threshold value may be adjusted according to the encoding of the transmitted communication signal. For example, if the transmitted communication signal is encoded according to a non-return-to-zero (NRZ) scheme, the threshold value may be assigned to the statistical mean of the positive and negative amplitudes representing the symbols binary one and binary zero. The symbols of the communications signal from step 812 that are greater than the threshold value may be assigned to binary one, while the symbols of the communications signal from step 812 that are less than the threshold are assigned to binary zero. When providing the soft decision, the communications signal from step 812 may additionally include other information, such as the slicer error, the BER, the SER, the SNR, or any other suitable signal parameter.

At step 816, the communications signal from step 814 is error corrected. The errors in the communications signal from step 814 may result from, but are not limited to the interference and/or the distortion impressed into the transmitted communication signal by the transmitter, the communication channel, and/or the receiver, the downconverting of the communications signal from step 802, or the digitization of the communications signal from step 812 to provide some examples. Step 816 may be implemented using any decoding scheme, such as a block decoding scheme, such as Reed-Solomon decoding, a convolutional decoding scheme, such as the Viterbi algorithm, a concatenated decoding scheme involving inner and outer codes, or decoding schemes using iterative decoding, and/or any other suitable decoding scheme that will be apparent to those skilled in the art(s) to correct for errors.

Figure 9:
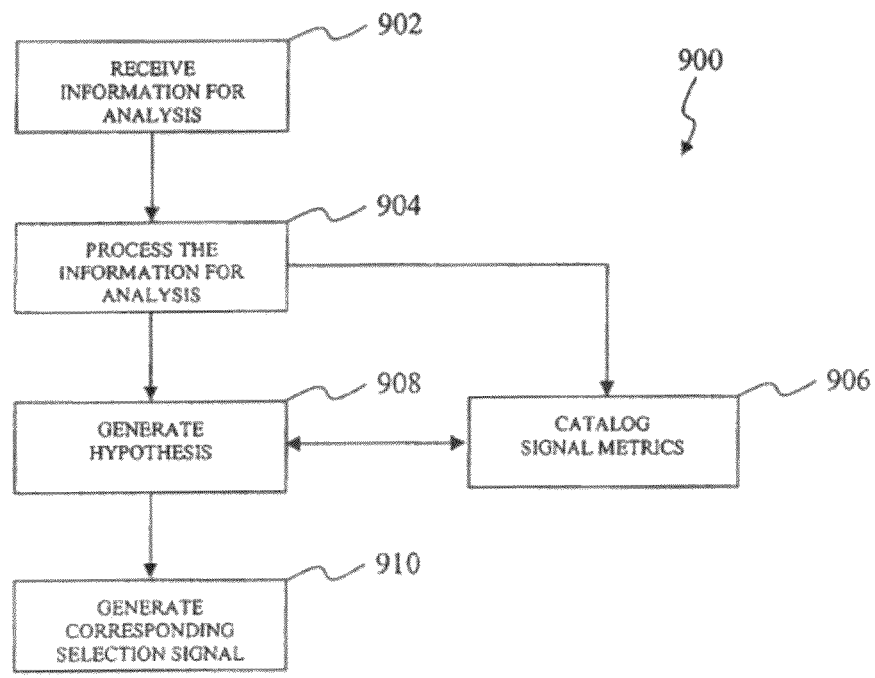
FIG. 9 is a flowchart of exemplary operational steps of a noise analyzer according to an aspect of the present invention.

FIG. 9 is a flowchart of exemplary operational steps of a noise analyzer according to an aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 9.

At step 902, information for analysis is received by a noise analyzer module, such as the noise analyzer 310 or the noise analyzer 614 to provide some examples. The noise analyzer module may operate in a direct analysis method, an indirect analysis method, and/or a combination of the direct analysis method and the indirect analysis method. As an alternate to the direct analysis method and/or the indirect analysis method, a method of analysis such as disclosed in U.S. patent application Ser. No. 10/391,555, entitled "System and Method for Periodic Noise Avoidance in Data Transmission Systems," filed on May 18, 2004, now U.S. Pat. No. 7,050,516, which is incorporated by reference in its entirety, may be used. In the direct analysis method and the indirect analysis method, the information for analysis includes a communication signal, such as the communication signal 350, a slicer information signal, such as the slicer information signal 360, the slicer information signal 656, or the slicer information signal 758, a decoder information signal, such as the decoder information signal 362, the decoder information signal 658, or the decoder information signal 760, and/or any combination thereof. The information for analysis may additionally include additional information computed directly from the communication signal by the noise analyzer. For example, the information for analysis may include a frequency response of the communication signal as computed by the noise analyzer.

At step 904, the information for analysis from step 902 is processed by the noise analyzer to compute one or more signal metrics of the communication signal. The direct analysis method processes the information for analysis in non-real-time. As a result of the non-real-time processing in the direct analysis method, an adaptive equalizer, such as the adaptive equalizer 304, the adaptive equalizer 602, and/or the adaptive equalizer 704 to provide some examples, buffers the communication signal by one or more bits to allow for the processing of the information for analysis. The non-real-time processing allows the noise analyzer to analyze the compensation for the noise and/or interference in the presence of the one or more time-varying noise and/or interference conditions embedded in the communication signal by the adaptive equalizer. For example, the noise analyzer may hypothesize that the one or more time-varying noise and/or interference conditions are present and/or absent from the communication signal. The noise analyzer may monitor parameters of the adaptive equalizer, such as, but not limited to, equalization coefficients to provide an example, to determine an accuracy of the hypothesis. In contrast, the indirect analysis method processes the information for analysis in real-time. The indirect analysis method directly processes the communication signal, the slicer information signal, the decoder information signal, any suitable signal parameter that may be derived from the communication signal, the slicer information signal and/or the decoder information signal, and/or any combination thereof. In an exemplary embodiment, the noise analyzer hypothesizes whether the communication signal includes a white or a flat noise spectrum or a noise spectrum including the noise and/or interference in the presence of the one or more time-varying noise and/or interference conditions.

At step 906, the one or more signal metrics from step 904 are cataloged by the noise analyzer based upon a hypothesis from step 908. The noise analyzer stores and/or updates the one or more signal metrics to identify the noise and/or interference in the presence and/or absence of the one or more time-varying noise and/or interference conditions based upon the hypothesis from step 908. As an example, if step 908 hypothesizes the noise and/or interference includes a first time-varying noise and/or interference condition and a second time-varying noise and/or interference condition, the noise analyzer stores and/or updates the one or more signal metrics corresponding to first time-varying noise and/or interference condition. The one or more signal metrics corresponding to the second time-varying noise and/or interference condition continue in their current state.

At step 908, the one or more signal metrics from step 904 are compared with the one or more signal metrics cataloged in step 906 to generate a hypothesis relating to the presence and/or absence of the one or more time-varying noise and/or interference conditions embedded in the communication signal. In an exemplary embodiment, the hypothesis includes a particular condition is embedded in the communication signal in the presence of the one or more time-varying noise and/or interference conditions.

At step 910, a selection signal, such as the coefficient selection signal 356 and/or the equalizer selection signal 660 to provide some examples, is generated based upon the hypothesis from step 908. From the discussion above, the adaptive equalizer updates equalization coefficients to compensate for the interference and/or the distortion for a corresponding time-varying noise and/or interference condition based on the selection signal.

CONCLUSION

While various embodiments of the present invention have been described above, it should be understood that they have been presented by way of example, and not limitation. It will be apparent to persons skilled in the relevant art(s) that various changes in form and detail may be made therein without departing from the spirit and scope of the invention. Thus the present invention should not be limited by any of the above-described exemplary embodiments, but should be defined only in accordance with the following claims and their equivalents.

What is claimed is:

1. A method for compensating effects of a communication channel on a communication signal, comprising:
   generating analysis information from the communication signal, wherein the analysis information includes a slicer information signal or a decoder information signal;
   processing the analysis information to generate a metric of the communication signal;
   comparing the generated metric to each of a plurality of previously stored metrics, each of the plurality of previously stored metrics corresponding to a respective condition of a plurality of conditions of the communication channel;
   generating a hypothesis regarding a current condition of the communication channel based on the comparison of the generated metric to each of the plurality of previously stored metrics, wherein the current condition of the communication channel represents a current state of at least one of noise and interference on the communication channel;
   configuring an equalizer based on the hypothesis; and
   processing the communication signal using the equalizer to reduce the effects of the communication channel on the communication signal.

2. The method of claim 1, wherein the analysis information further includes a frequency response of the communication signal.

3. The method of claim 1, wherein the processing of the analysis information is performed in non-real-time.

4. The method of claim 1, further comprising:
   analyzing a performance measure of the equalizer in processing the communication signal; and
   updating the hypothesis based on the performance measure.

5. The method of claim 1, wherein the processing of the analysis information is performed in real-time.

6. The method of claim 1, wherein the hypothesis regarding the current condition of the communication channel includes one or more of: presence or absence of a first condition and presence or absence of a second condition.

7. The method of claim 6, wherein at least one of the first condition and the second condition relates to noise and/or interference in the communication channel.

8. The method of claim 1, further comprising:
   associating the generated metric with at least one condition of the plurality of conditions of the communication channel; and
   storing the generated metric with the plurality of previously stored metrics.

9. The method of claim 1, further comprising:
   updating at least one metric of the plurality of previously stored metrics using the generated metric, wherein the at least one metric is associated with the hypothesized current condition of the communication channel.

10. The method of claim 1, wherein configuring the equalizer comprises:
    generating a coefficient selection signal based on the hypothesis;
    producing equalization coefficients of the equalizer based on the coefficient selection signal; and
    providing the equalization coefficients to the equalizer.

11. The method of claim 1, wherein configuring the equalizer comprises:
    generating an equalizer selection signal based on the hypothesis, wherein the equalizer selection signal identifies the equalizer; and
    updating equalization coefficients of the equalizer based on the equalizer selection signal.

12. A communications receiver for compensating effects of a communication channel on a communication signal, comprising:
    a noise analyzer configured to:
       process analysis information related to a communication signal, wherein the analysis information includes a slicer information signal or a decoder information signal generated from the communication signal, to generate a metric of the communication signal;
       compare the generated metric to each of a plurality of previously stored metrics; and
       generate a hypothesis regarding a current condition of the communication channel based on the comparison of the generated metric to each of the plurality of stored metrics, wherein the current condition of the communication channel represents a current state of at least one of noise and interference on the communication channel; and
    an adaptive equalizer configured to process the communication signal based on the generated hypothesis.

13. The communications receiver of claim 12, wherein each of the plurality of previously stored metrics corresponds to a respective condition of a plurality of conditions of the communication channel.

14. The communications receiver of claim 12, further comprising:
    a slicer, coupled to the adaptive equalizer, configured to generate the slicer information signal; and a decoder, coupled to the slicer, configured to generate the decoder information signal.

15. The communications receiver of claim 12, wherein the hypothesis regarding the current condition of the communication channel includes one or more of presence or absence of a first condition and presence or absence of a second condition.

16. The communications receiver of claim 15, wherein at least one of the first condition and the second condition relates to noise and/or interference in the communication channel.

17. The communications receiver of claim 12, wherein the noise analyzer is further configured to generate a coefficient selection signal based on the hypothesis, the communications receiver further comprising:
   a coefficient generator configured to produce equalization coefficients of the adaptive equalizer based on the coefficient selection signal, and to provide the equalization coefficients to the adaptive equalizer.

18. A method for compensating effects of a communication channel on a communication signal, comprising:
   generating analysis information from the communication signal;
   processing the analysis information to generate a metric of the communication signal;
   comparing the generated metric to each of a plurality of previously stored metrics to generate a hypothesis regarding a presence of a first condition or a presence of a second condition of the communication channel, wherein the first condition corresponds to a narrowband, high power noise and/or interference component and the second condition corresponds to a wideband, low power noise and/or interference component;
   configuring an equalizer based on the hypothesis; and
   processing the communication signal using the equalizer to reduce the effects of the communication channel on the communication signal.

* * * * *

UNITED STATES PATENT AND TRADEMARK OFFICE
CERTIFICATE OF CORRECTION

PATENT NO. : 8,891,709 B2  
APPLICATION NO. : 13/451199  
DATED : November 18, 2014  
INVENTOR(S) : Kolze et al.

Page 1 of 1

It is certified that error appears in the above-identified patent and that said Letters Patent is hereby corrected as shown below:

In the Specification

In column 9, line 26, please replace "pi" with --µ--.

Signed and Sealed this  
Twenty-fourth Day of February, 2015

Michelle K. Lee  
*Deputy Director of the United States Patent and Trademark Office*